(12) United States Patent
Watanabe et al.

(10) Patent No.: US 7,680,003 B2
(45) Date of Patent: Mar. 16, 2010

(54) OPTICAL DISK DEVICE WITH DISK TYPE RECOGNITION

(75) Inventors: Katsuya Watanabe, Nara (JP); Rie Takahashi, Osaka (JP)

(73) Assignee: Panasonic Corporation, Kadoma (JP)

( * ) Notice: Subject to any disclaimer, the term of this patent is extended or adjusted under 35 U.S.C. 154(b) by 737 days.

(21) Appl. No.: 11/535,518

(22) Filed: Sep. 27, 2006

(65) Prior Publication Data

US 2007/0070850 A1 Mar. 29, 2007

(30) Foreign Application Priority Data

Sep. 28, 2005 (JP) ............................. 2005-282262

(51) Int. Cl.
*G11B 7/00* (2006.01)
(52) U.S. Cl. ................... 369/44.23; 369/53.22
(58) Field of Classification Search ................ None
See application file for complete search history.

(56) References Cited

U.S. PATENT DOCUMENTS

| | | | | |
|---|---|---|---|---|
| 5,235,581 A | * | 8/1993 | Miyagawa et al. | 369/44.12 |
| 5,757,742 A | * | 5/1998 | Akiba et al. | 369/44.23 |
| 6,285,641 B1 | | 9/2001 | Dang et al. | |
| 6,934,226 B2 | * | 8/2005 | Yasuda et al. | 369/44.23 |
| 6,940,798 B2 | * | 9/2005 | Noborimoto et al. | 369/53.22 |
| 7,123,565 B2 | * | 10/2006 | Ariyoshi et al. | 369/53.22 |
| 7,190,650 B2 | * | 3/2007 | Fujiune et al. | 369/53.22 |
| 7,277,372 B2 | | 10/2007 | Watanabe et al. | |
| 2004/0037197 A1 | | 2/2004 | Fujiune et al. | |
| 2004/0095860 A1 | * | 5/2004 | Ariyoshi et al. | 369/44.32 |
| 2005/0117496 A1 | | 6/2005 | Ori et al. | |
| 2006/0280082 A1 | * | 12/2006 | Yasukawa | 369/53.2 |

FOREIGN PATENT DOCUMENTS

EP 0 725 395 A2 8/1996

(Continued)

OTHER PUBLICATIONS

European Search Report for corresponding European Application No. EP 06121362.5 dated Mar. 17, 2008.

(Continued)

*Primary Examiner*—Peter Vincent Agustin
(74) *Attorney, Agent, or Firm*—Renner, Otto, Boisselle & Sklar, LLP

(57) ABSTRACT

The optical disk drive of the present invention can read data from multiple types of optical disks and includes: a motor for spinning a given optical disk; at least one light source for radiating light beams with multiple different wavelengths; at least one lens for converging each light beam onto the disk; a spherical aberration correcting section that can change the spherical aberration states of the beam; and a control section for controlling the operations of the motor, light source, lens and spherical aberration correcting section. The control section includes a disk type recognizing section that irradiates the disk with a light beam using the light source and the lens, thereby recognizing the type of the disk. The recognizing section performs the recognition by reference to first and second signal waveforms that have been generated based on the light beams reflected from the optical disk when the spherical aberration correcting section sets the spherical aberration states of the light beam to first and second states, respectively.

15 Claims, 23 Drawing Sheets

FOREIGN PATENT DOCUMENTS

| | | |
|---|---|---|
| EP | 1 394 782 A2 | 3/2004 |
| EP | 1 469 463 A1 | 10/2004 |
| JP | 09-147376 | 6/1997 |
| JP | 10-049885 | 2/1998 |
| JP | 2002-183978 | 6/2002 |
| JP | 2003-099970 | 4/2003 |
| JP | 2005-149703 | 6/2005 |

OTHER PUBLICATIONS

Notice of Reasons for Rejection issued on Jul. 15, 2008 for Japanese Patent Application No. 2006-255934.

* cited by examiner (a)

(b) FE (c) RE

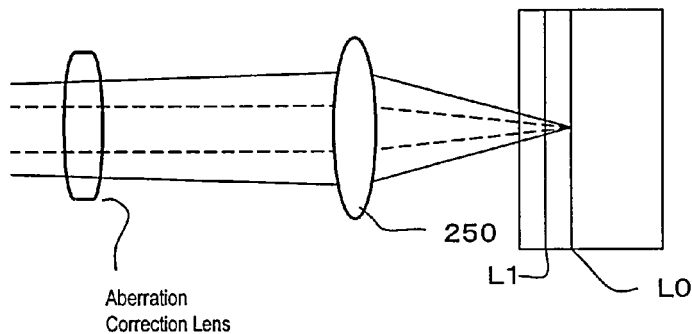
FIG. 6A
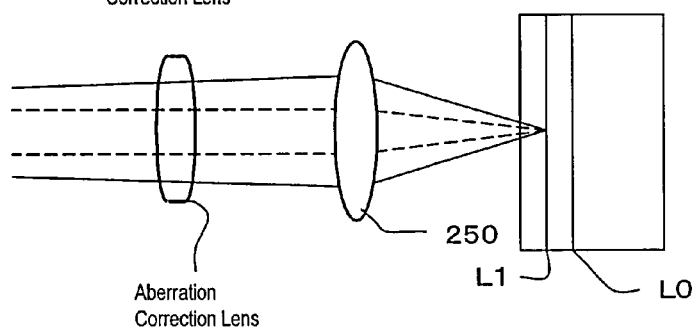
FIG. 6B
FIG. 6C
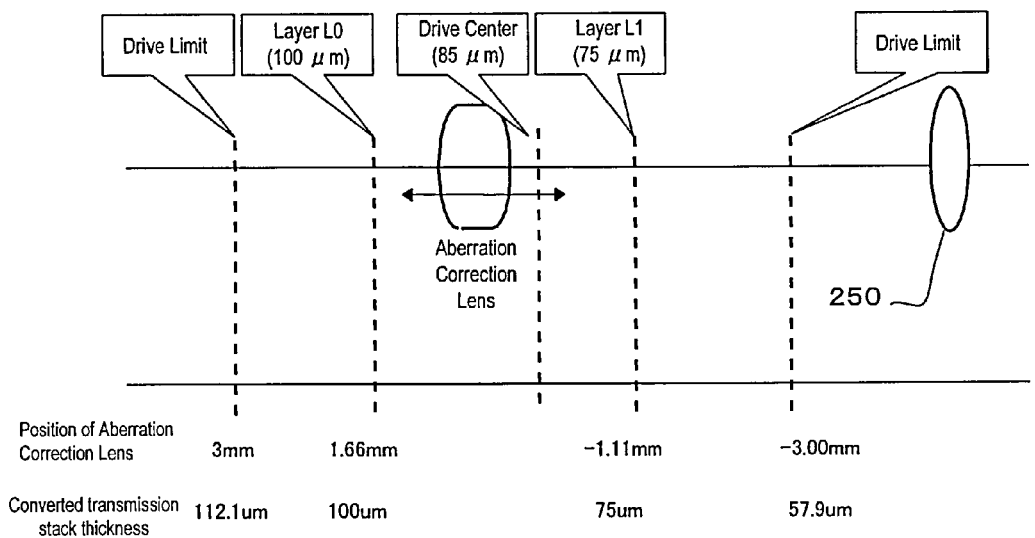

Amplitude = X1−X2

Degree of Symmetry = 1−( | X1+X2 | /Amplitude)

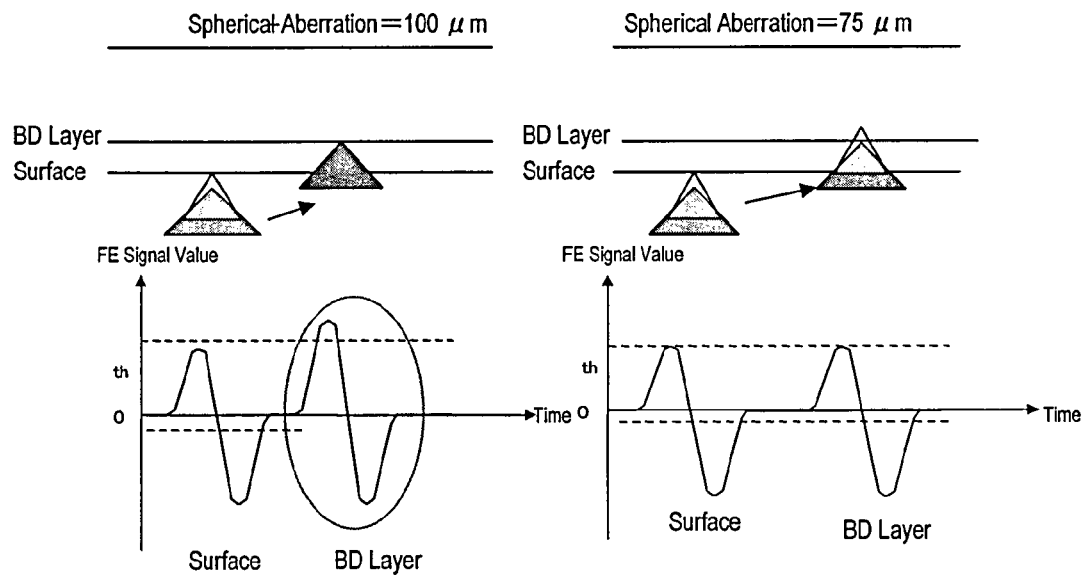
FIG. 16A
FIG. 16B
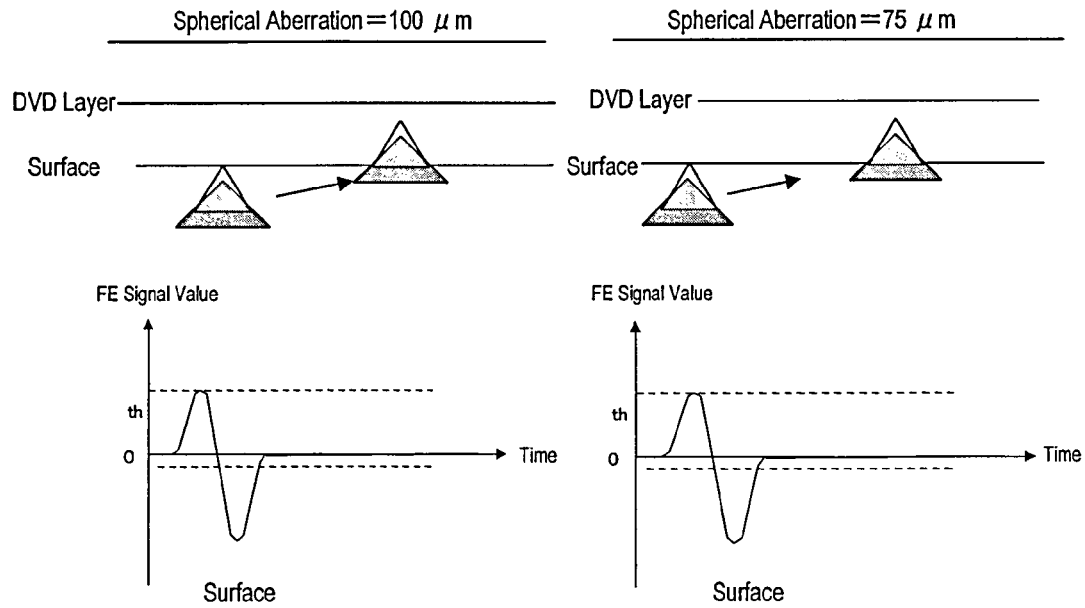
FIG. 16C
FIG. 16D

OPTICAL DISK DEVICE WITH DISK TYPE RECOGNITION

BACKGROUND OF THE INVENTION

1. Field of the Invention

The present invention relates to an optical disk drive for reading and/or writing data from/on a spinning disklike information storage medium (which will be referred to herein as an "optical disk"). More particularly, the present invention relates to an optical disk drive that can properly recognize the type of a given optical disk that has been selected among multiple types of optical disks complying with mutually different standards.

2. Description of the Related Art

In optical disk technologies, data can be read out from a rotating optical disk by irradiating the disk with a relatively weak light beam with a constant intensity, and detecting the light that has been modulated by, and reflected from, the optical disk.

On a read-only optical disk, information is already stored as pits that are arranged spirally during the manufacturing process of the optical disk. On the other hand, on a rewritable optical disk, a recording material film, from/on which data can be read and written optically, is deposited by an evaporation process, for example, on the surface of a substrate on which tracks with spiral lands or grooves are arranged. In writing data on such a rewritable optical disk, data is written there by irradiating the optical disk with a light beam, of which the optical power has been changed according to the data to be written, and locally changing the property of the recording material film.

It should be noted that the depth of the pits, the depth of the tracks, and the thickness of the recording material film are all smaller than the thickness of the optical disk base material. For that reason, those portions of the optical disk, where data is stored, define a two-dimensional plane, which is sometimes called an "information storage plane". However, considering that such an "information storage plane" actually has a physical dimension in the depth direction, too, the term "information storage plane" will be replaced herein by another term "information storage layer". Every optical disk has at least one such information storage layer. Optionally, a single information storage layer may actually include a plurality of layers such as a phase-change material layer and a reflective layer.

To read data that is stored on a recordable optical disk or to write data on such an optical disk, the light beam always needs to maintain a predetermined converging state on a target track on an information storage layer. For that purpose, a "focus control" and a "tracking control" are required. The "focus control" means controlling the position of an objective lens perpendicularly to the information storage layer (which direction will be referred to herein as a "substrate depth direction") such that the focus position (or converging point) of the light beam is always located on the information storage layer. On the other hand, the "tracking control" means controlling the position of the objective lens along the radius of a given optical disk (which direction will be referred to herein as a "disk radial direction") such that the light beam spot is always located right on a target track.

Various types of optical disks such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now. Currently, next-generation optical disks, including Blu-ray disc (BD), which can store an even greater amount of information at a much higher density, are under development, and some of them have already been put on the market.

The physical structures of these optical disks change from one type to another. For example, these optical disks are different in physical track structure, track pitch, and depth of the information storage layer (i.e., the distance from the surface of the optical disk, through which the incoming light enters the disk, to the information storage layer). To read or write data properly from/on these multiple types of optical disks with those various physical structures, the information storage layer of each of these optical disks needs to be irradiated with a light beam with an appropriate wavelength by using an optical system that has a numerical aperture (NA) associated with the specific type of the disk.

FIG. 1 is a perspective view schematically illustrating an optical disk 200. Just for reference, an objective lens (converging lens) 20 and a light beam 22 that has been converged by this objective lens 20 are shown in FIG. 1. The light beam 22 passes through the light-incoming side of the optical disk 200 and is converged onto the information storage layer, thereby forming a light beam spot on the information storage layer.

FIGS. 2A, 2B and 2C schematically illustrate cross sections of a CD, a DVD and a BD, respectively. Each of these optical disks shown in FIG. 2 has a principal surface (i.e., light-incoming side) 200a and a back surface (i.e., a label side) 200b and includes at least one information storage layer 214 between these surfaces. On the back surface 200b of the optical disk, arranged is a label layer 218 on which the title, graphics, and so on have been printed. Any of these optical disks has an overall thickness of 1.2 mm and a diameter of 12 cm. For the sake of simplicity, pits, grooves and other unevenness are not shown in FIG. 2 and the reflective layer is not shown there, either.

As shown in FIG. 2A, the CD's information storage layer 214 is located at a depth of about 1.1 mm as measured from the principal surface 200a. To read data from the CD's information storage layer 214, a near-infrared laser beam (with a wavelength of 785 nm) needs to be converged such that its focal point is located right on the information storage layer 214 by focus control. The objective lens for use to converge the light beam needs to have a numerical aperture (NA) of approximately 0.5.

As shown in FIG. 2B, the DVD's information storage layer 214 is located at a depth of approximately 0.6 mm as measured from the principal surface 200a. In an actual DVD, two substrates, each having a thickness of approximately 0.6 mm, are boned together with an adhesive layer. In an optical disk with two information storage layers 214, the respective distances from the principal surface 200a to the information storage layers 214 are approximately 0.57 mm and approximately 0.63 mm, respectively. That is to say, those two information storage layers are located very close to each other. That is why only one information storage layer 214 is shown in FIG. 2B, no matter how many information storage layers 214 are actually included. To read and write data from/on the DVD's information storage layer 214, a red laser beam (with a wavelength of 660 nm) needs to be converged such that its focal point is located right on the information storage layer 214 by focus control. The objective lens for use to converge the light beam needs to have a numerical aperture (NA) of approximately 0.6.

As shown in FIG. 2C, the BD includes a thin coating layer (light transmitting layer or transmission stack) with a thickness of approximately 100 μm on the principal surface 200a and its information storage layer 214 is located at a depth of about 0.1 mm as measured from the principal surface 200a. To read data from the BD's information storage layer 214, a blue-violet beam (with a wavelength of 405 nm) needs to be converged such that its focal point is located right on the information storage layer 214 by focus control. The objective lens for use to converge the light beam needs to have a numerical aperture (NA) of approximately 0.85.

Currently, these various types of optical disks are on the market and used extensively. Under the circumstances like these, a single optical disk drive should read from, and write to, as many types of optical disks as possible. For that purpose, the optical disk drive should include a light source and an optical system, both of which can deal with multiple types of optical disks, and should appropriately recognize the type of the optical disk that has been loaded into the optical disk drive.

The optical disk drive disclosed in Japanese Patent Application Laid-Open Publication No. 2002-183978 recognizes the type of the given optical disk by optically detecting the depth of the information storage layer of that optical disk. That is to say, this optical disk drive sequentially detects the surface of the optical disk and then the information storage layer thereof based on a signal representing the light that has been reflected from the optical disk while moving the objective lens in the optical reference axis direction. The time lag between the point in time when the surface of the optical disk is detected and the point in time when the information storage layer is detected corresponds to the depth of the information storage layer. That is why the type of the given optical disk can be recognized by this time lag.

Portion (a) of FIG. 3 schematically illustrates how the gap between the principal surface 200a of the optical disk 200 and the objective lens 20 decreases gradually. This optical disk 200 includes a substrate 212, which is transparent to a light beam, an information storage layer 214 that has been formed on the substrate 212, and a protective layer (coating layer) 216 that covers the information storage layer 214. The optical disk 200 illustrated in portion (a) of FIG. 3 corresponds to a BD and the coating layer 216 has a thickness of about 0.1 mm. There is a label layer 218 on which an image, characters and so on are printed, on the back surface 200b of the optical disk. It should be noted that the thickness of the label layer 218 is not to scale.

Portion (a) of FIG. 3 illustrates a situation where the focus position of the light beam 22 is located on the surface 200a of the optical disk, a situation where the focal point of the light beam 22 is located on the information storage layer 214, and a situation where the focal point of the light beam 22 is located inside the substrate 212. Portion (b) of FIG. 3 schematically shows a focus error (FE) signal to be generated when the focus position of the light beam 22 varies with time. The FE signal changes so as to draw a small S-curve when the focal point of the light beam 22 passes the surface 200a of the optical disk 200. On the other hand, when the focal point of the light beam 22 passes the information storage layer 214 of the optical disk 200, the FE signal changes so as to draw large S-curves. Portion (c) of FIG. 3 schematically shows the amplitude of a radio frequency (RF) read signal to be generated when the focus position of the light beam 22 varies with time. It can be determined that the focal point of the light beam 22 is located on the information storage layer 114 when the amplitude of the RF signal shows a non-zero significant value and when the FE signal goes zero. If the focus servo is turned ON in such a situation, the position of the objective lens 20 is controlled such that the FE signal is always equal to zero. Such an operation of turning the focus servo ON around the center of the S-curve of the FE signal (i.e., near the zero-cross point of the FE signal) when the S-curve is detected while a focus search is being carried out in search of the information storage layer 214 will be referred to herein as a "focus finding operation".

The position of the objective lens 20 when the S-curve of the FE signal is detected can be determined by reference to the value or magnitude of the electrical signal being supplied to the actuator (not shown) that is controlling the position of the objective lens 20. As a result, the depth of the information storage layer 214 can be detected, and eventually, the type of the given optical disk can be recognized by the depth of the information storage layer 214.

On the other hand, Japanese Patent Application Laid-Open Publication No. 2005-149703 discloses a method for recognizing the type of a given optical disk by moving the objective lens in the focusing direction and by normalizing the amplitude of the FE signal with the intensity of the reflected light.

The technique disclosed by Japanese Patent Application Laid-Open Publication No. 2002-183978 has the following drawbacks.

The focal length of an objective lens included in a BD optical system is shorter than that of an objective lens included in a DVD optical system or a CD optical system. That is why if the given optical disk is going to be recognized using the BD optical system, then neither the information storage layer of a DVD nor that of a CD can be detected because their information storage layers are located at relatively deep levels. On the other hand, if the given optical disk is going to be recognized using the DVD optical system or the CD optical system, then the disk surface and the information storage layer of a BD are located too close to each other to distinguish them clearly.

Besides, according to the method of Japanese Patent Application Laid-Open Publication No. 2002-183978, both the surface of the given disk and the information storage layer thereof need to be detected properly. However, since the surface of an optical disk had low reflectance, the surface of the optical disk could not be detected properly, but noise in a signal might be taken for the surface of the optical disk by mistake, no matter what type of optical system is used.

For these reasons, it is difficult to apply the technique disclosed in Japanese Patent Application Laid-Open Publication No. 2002-183978 to getting various types of optical disks, including a BD, dealt with by a single optical disk drive.

Meanwhile, according to the technique disclosed in Japanese Patent Application Laid-Open Publication No. 2005-149703, the type of the given optical disk could not be recognized properly due to a variation in distance from the surface of the optical disk to the information storage layer thereof and a variation in the degree of modulation of data being written. Among other things, the correlation between the amplitude of the FE signal and the intensity of the reflected light is easily variable according to the degree of modulation of data being written.

In order to overcome the problems described above, a primary object of the present invention is to provide an optical disk drive that can deal with multiple types of optical disks, including BDs, and that can recognize the type of the given optical disk highly accurately.

Another object of the present invention is to provide an optical disk drive that is designed to read and write data from/on a BD but can appropriately recognize non-BD optical disks, too.

SUMMARY OF THE INVENTION

An optical disk drive according to the present invention has the ability to read data from a given optical disk that includes at least one information storage layer. The drive includes: a motor for spinning the given optical disk; at least one optical system including at least one light source for radiating a light beam and a lens for converging the light beam onto the optical disk; a spherical aberration correcting section that is able to change the spherical aberration states of the light beam; and a control section for controlling the operations of the motor, the optical system and the spherical aberration correcting section. The control section includes disk type recognizing means that makes the optical system irradiate the optical disk with the light beam, thereby determining whether or not the given optical disk is compatible with the optical system. The disk type recognizing means recognizes the type of the given optical disk by reference to first and second signal waveforms that have been generated based on the light beams reflected from the optical disk when the spherical aberration correcting section sets the spherical aberration states of the light beams to a first state and a second state, respectively. The second state is different from the first state.

Another optical disk drive according to the present invention has the ability to read data from multiple types of optical disks, each including at least one information storage layer. The drive includes: a motor for spinning a given one of the optical disks; at least one light source for radiating light beams with multiple different wavelengths; at least one lens for converging each said light beam onto the optical disk; a spherical aberration correcting section that is able to change the spherical aberration states of the light beam; and a control section for controlling the operations of the motor, the light source, the lens and the spherical aberration correcting section. The control section includes disk type recognizing means that irradiates the given optical disk with a light beam using the light source and the lens, thereby recognizing the type of the given optical disk. The disk type recognizing means recognizes the type of the given optical disk by reference to first and second signal waveforms that have been generated based on the light beams reflected from the optical disk when the spherical aberration correcting section sets the spherical aberration states of the light beam to a first state and a second state, respectively. The second state is different from the first state.

In one preferred embodiment, the control section gets the first and second signal waveforms while controlling the spherical aberration correcting section so as to minimize the spherical aberration, and to produce a spherical aberration, respectively, with respect to an optical disk compatible with the light source and the lens that are used to radiate the light beam.

In another preferred embodiment, when a parameter proportional to a difference between the first and second signal waveforms exceeds a reference value, the disk type recognizing means finds the given optical disk compatible with the light source and the lens that are used to radiate the light beam.

In still another preferred embodiment, in controlling the spherical aberration correcting section so as to minimize the spherical aberration with respect to the optical disk compatible with the light source and the lens that are used to radiate the light beam, the control section changes the magnitudes of correction made by the spherical aberration correcting section into multiple different values and selects a signal waveform with the greatest amplitude as the first signal waveform from multiple signal waveforms that have been generated based on the light beams reflected from the optical disk at the multiple different magnitudes of correction.

In this particular preferred embodiment, the multiple different magnitudes of correction made by the spherical aberration correcting section are selected from a correction value range corresponding to a standard range of permissible transmission stack thicknesses of the optical disk that is compatible with the light source and the lens used to radiate the light beam.

In yet another preferred embodiment, the first and second signal waveforms are gotten by measuring a focus error signal that has been generated based on the light beam reflected from the optical disk.

In this particular preferred embodiment, the first and second signal waveforms have magnitudes that change with the amplitude of the focus error signal.

In a specific preferred embodiment, in performing the disk type recognition operation, the control section makes the light source irradiate the optical disk with a light beam having a wavelength of 400 nm to 410 nm using an objective lens having a numerical aperture of 0.84 to 0.86 as the lens initially.

In this particular preferred embodiment, if the parameter that is proportional to the difference between the first and second signal waveforms is equal to or smaller than a first reference value, the disk type recognizing means recognizes the given optical disk as a non-BD. If the parameter is greater than a second reference value that is greater than the first reference value, the disk type recognizing means recognizes the given optical disk as a BD. And if the parameter is greater than the first reference value but equal to or smaller than the second reference value, the control section gets the spherical aberration states of the light beam changed by the spherical aberration correcting section into a third state, which is different from the first and second states and in which the spherical aberration is minimized if a CD is loaded upside down, measures a third signal waveform that has been generated based on the light beam reflected from the optical disk, and determines that a CD has been loaded upside down if the amplitude of the third signal waveform has increased from that of the second signal waveform.

Another optical disk drive according to the present invention includes a motor for spinning a given optical disk and an optical pickup for accessing the optical disk optically. The optical pickup includes: at least one light source for radiating a first light beam having a wavelength of 400 nm to 410 nm and a second light beam that has a longer wavelength than the first light beam; a first lens with a numerical aperture of 0.84 to 0.86 for converging the first light beam onto the optical disk; and a second lens for converging the second light beam onto the optical disk. The optical disk drive includes disk type recognizing means for determining whether or not the given optical disk is readable with the first light beam and the first lens by irradiating the disk with the first light beam through the first lens.

A driving method according to the present invention is a method for driving an optical disk drive having the ability to read data from an optical disk including at least one information storage layer. The method includes the steps of: obtaining a first signal waveform by irradiating the optical disk with a light beam, of which the spherical aberration has been set to a first state, and by detecting the light beam that has been reflected from the optical disk; obtaining a second signal waveform by irradiating the optical disk with a light beam, of which the spherical aberration has been set to a second state that is different from the first state, and by detecting the light beam that has been reflected from the optical disk; and recognizing the type of the given optical disk by the first and second signal waveforms.

In one preferred embodiment, spherical aberration is produced in the second state with respect to an optical disk compatible with the light source and the lens that are used to radiate the light beam. The spherical aberration in the first state is set to be smaller than that in the second state.

In another preferred embodiment, when a parameter proportional to a difference between the first and second signal waveforms exceeds a reference value, the given optical disk is found to be compatible with the light source and the lens that are used to radiate the light beam.

In still another preferred embodiment, the spherical aberration is changed into multiple different states and a signal waveform with the greatest amplitude is selected as the first signal waveform from multiple signal waveforms that have been generated based on the light beams reflected from the optical disk in the multiple different spherical aberration states.

A controller according to the present invention is used in an optical disk drive including a spherical aberration correcting section. The controller includes disk type recognizing means for recognizing the type of an optical disk that has been loaded into the optical disk drive by irradiating the optical disk with a light beam. The disk type recognizing means recognizes the type of the given optical disk by reference to first and second signal waveforms that have been generated based on the light beams reflected from the optical disk when the spherical aberration correcting section sets the spherical aberration states of the light beams to a first state and a second state, respectively. The second state is different from the first state.

An optical disk drive according to the present invention can determine, by changing the settings of the spherical aberration correcting section, whether or not the given optical disk is compatible with the optical system being used. According to the present invention, there is no need to detect both the disk surface and the information storage layer accurately but variations in signals between multiple spherical aberration states are detected. Thus, none of the problems that have been pointed out for the prior art should occur according to the present invention.

Other features, elements, processes, steps, characteristics and advantages of the present invention will become more apparent from the following detailed description of preferred embodiments of the present invention with reference to the attached drawings.

Figure 1:
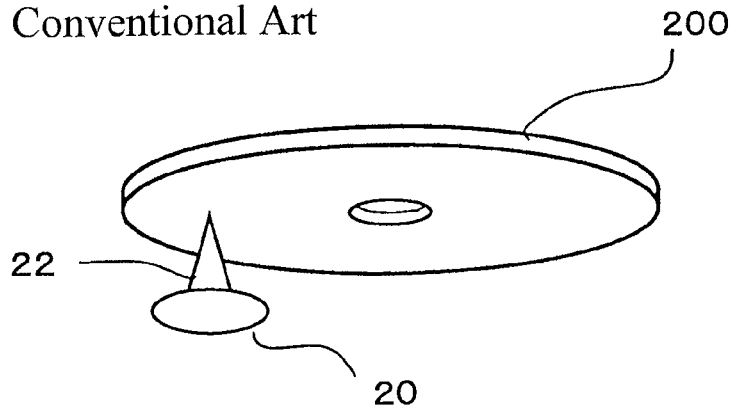
FIG. 1 is a perspective view schematically illustrating an optical disk 200.
Figure 2A:
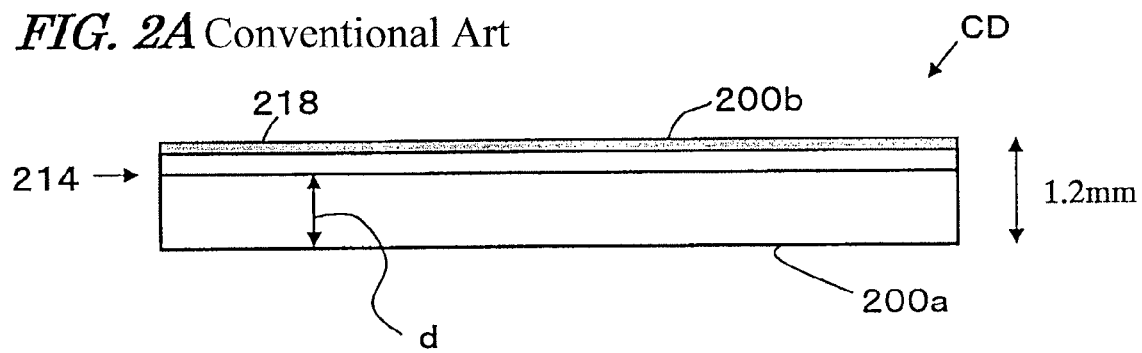
FIGS. 2A, 2B and 2C schematically show cross sections of a CD, a DVD and a BD, respectively.
Figure 2B:
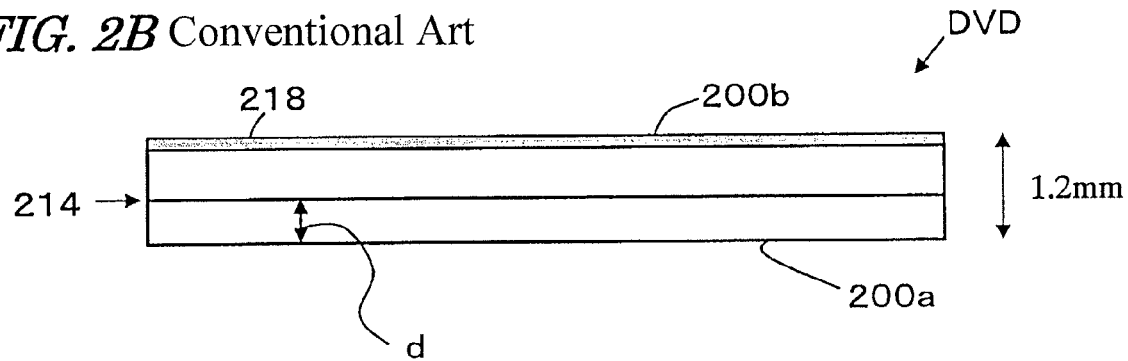
Figure 2C:
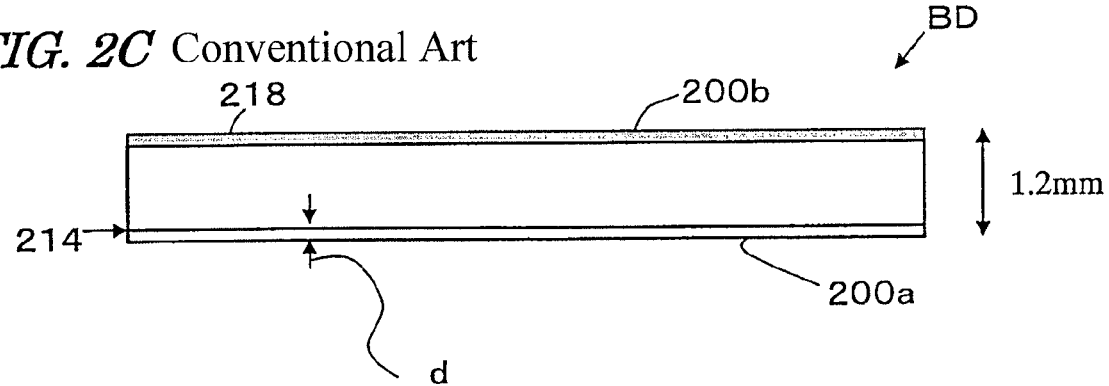
Figure 3:
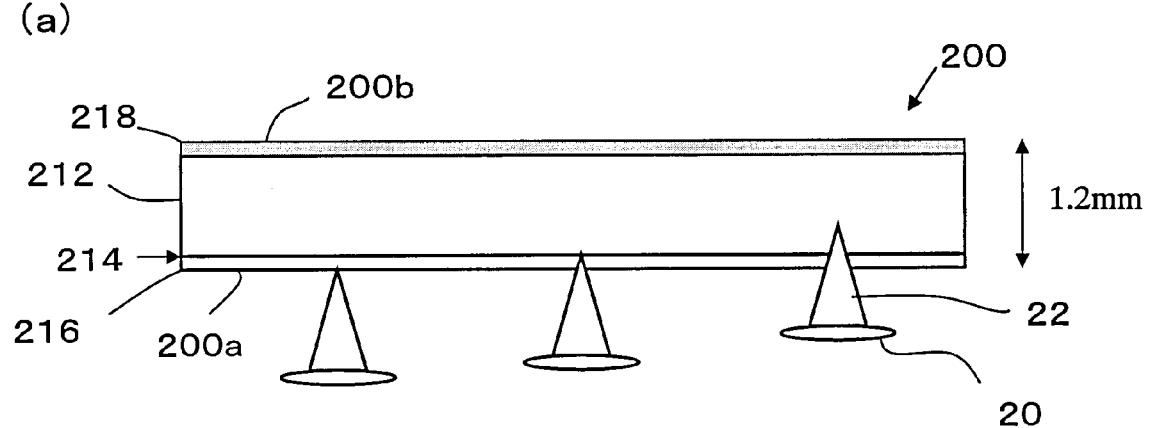
Figure 3:
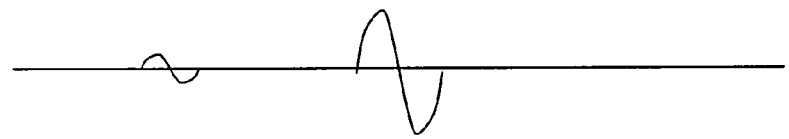
Figure 3:

Portion (a) of FIG. 3 schematically illustrates how the gap between the surface 200a of the optical disk 200 and objective lens 20 gradually narrows;

Portion (b) of FIG. 3 schematically shows a focus error (FE) signal to be generated when the focus position of the laser beam 22 varies with time; and Portion (c) of FIG. 3 schematically shows the amplitude of a radio frequency (RF) signal to be generated when the focus position of the laser beam 22 varies with time.

Figure 4A:
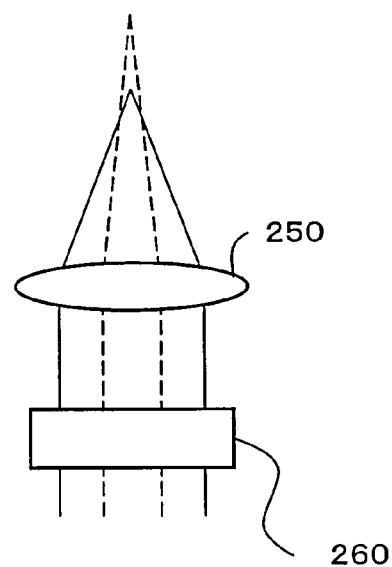
Figure 4B:
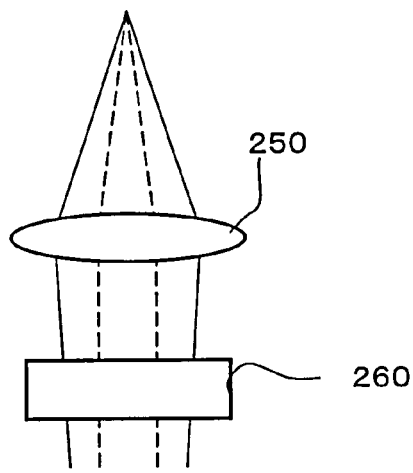

FIG. 4A shows a state where spherical aberration has been produced and FIG. 4B shows a state where no spherical aberration has been produced (i.e., the spherical aberration has been corrected).

Figure 5A:
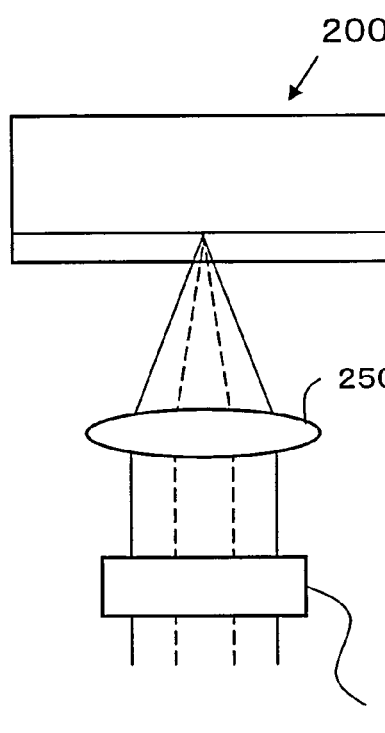
Figure 5B:
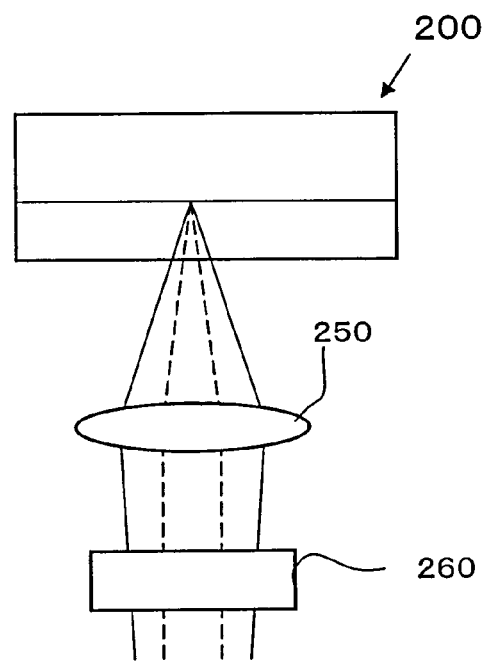

FIGS. 5A and 5B show how the spherical aberration is minimized on information storage layers that are located at mutually different depths.

FIGS. 6A and 6B show how to control the positions of an aberration corrective collimator lens to minimize the spherical aberration on the information storage layers that are located at mutually different depths.

FIG. 6C shows how the transmission stack thickness, at which the spherical aberration is minimized, can be changed by controlling the position of the aberration corrective collimator lens.

Figure 7A:
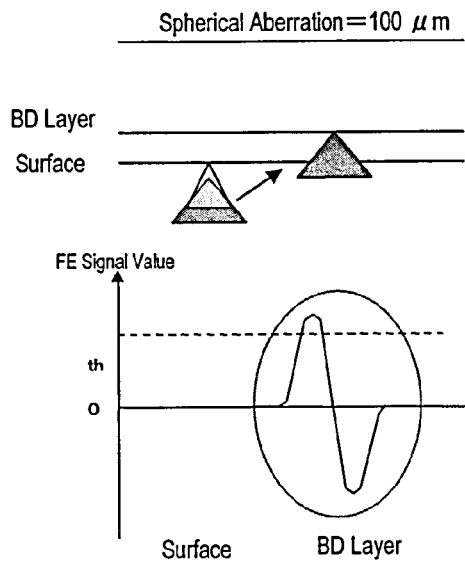
Figure 7B:
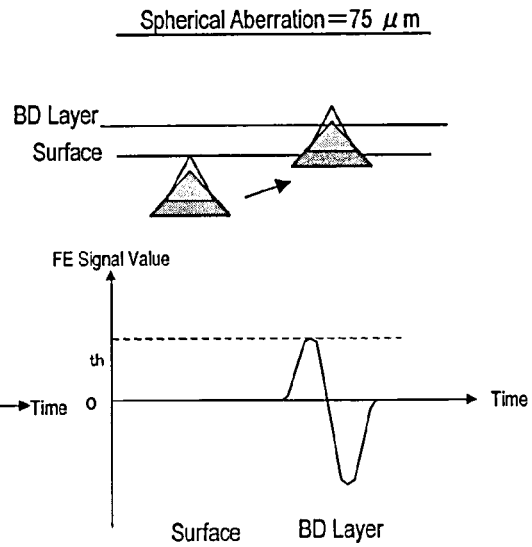
Figure 7C:
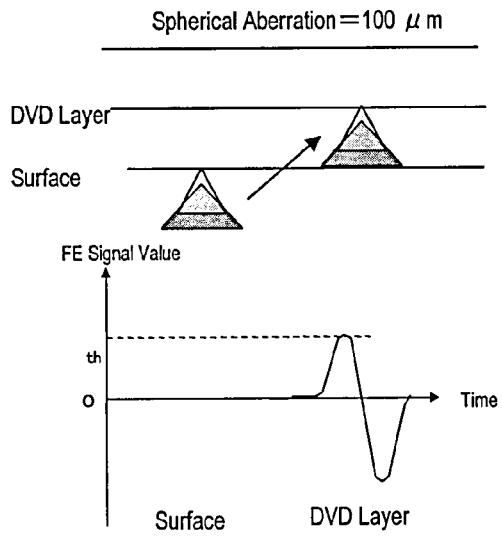

FIGS. 7A, 7B and 7C show the S-curves of FE signals that are generated under particular aberration correction conditions.

Figure 8A:
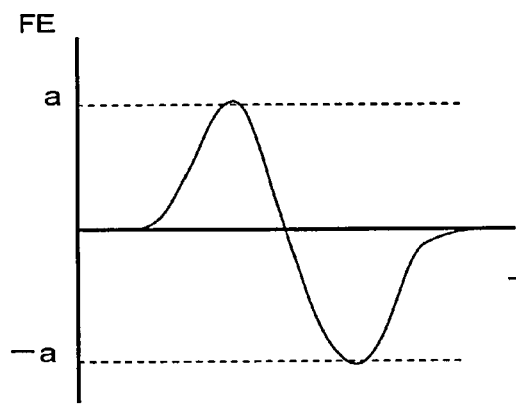
Figure 8B:
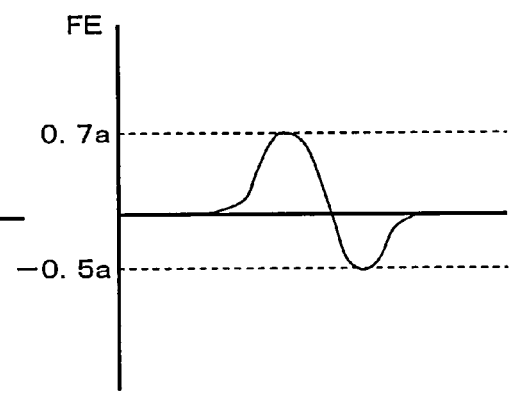

FIGS. 8A and 8B show the S-curves of FE signals that were detected using a BD optical system, wherein: FIG. 8A shows the waveform that was obtained when the optical disk loaded in the optical disk drive was a BD, while FIG. 8B shows the waveform that was obtained when the optical disk loaded in the optical disk drive was a DVD.

Figure 8C:
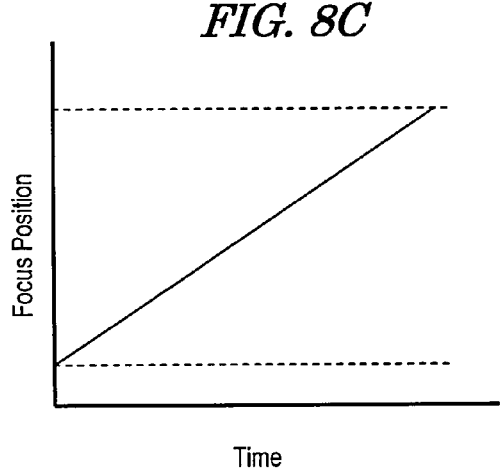
Figure 8D:
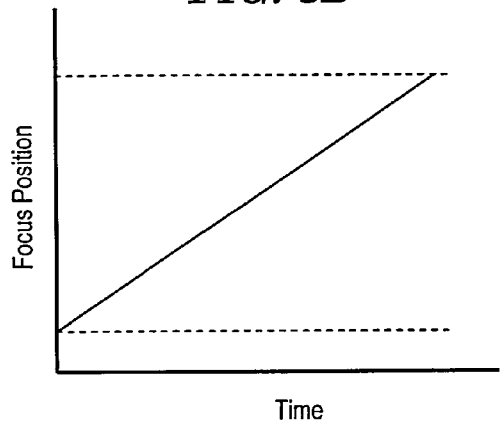

FIGS. 8C and 8D are graphs showing the focus positions (i.e., the positions in the optical reference axis direction) of a light beam to irradiate the optical disk.

Figure 9:
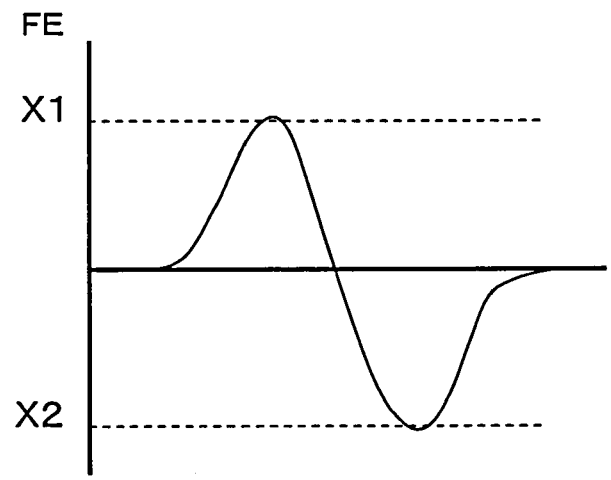

FIG. 9 shows the maximum value X1 and the minimum value X2 of the S-curve of an FE signal.

Figure 10:
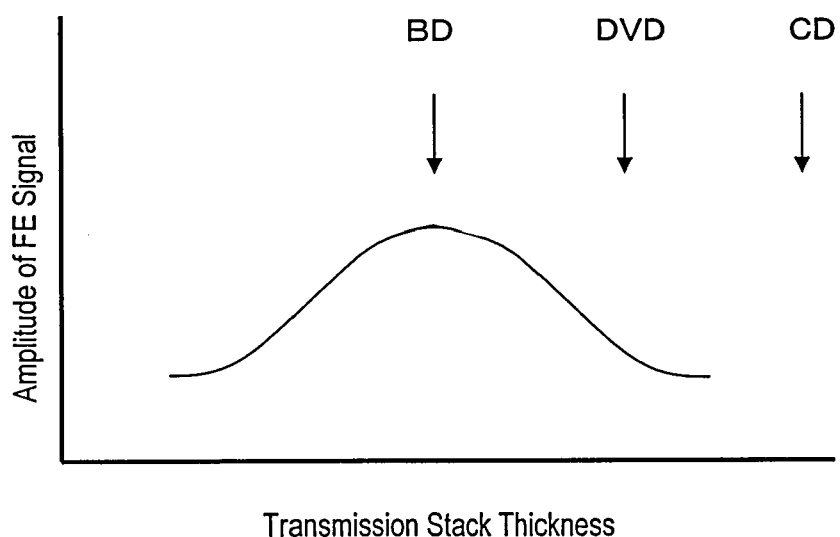

FIG. 10 is a graph showing how the amplitude of an FE signal detected from an optical disk changes with the transmission stack thickness (i.e., the distance from the disk surface to the information storage layer) of the optical disk.

Figure 11A:
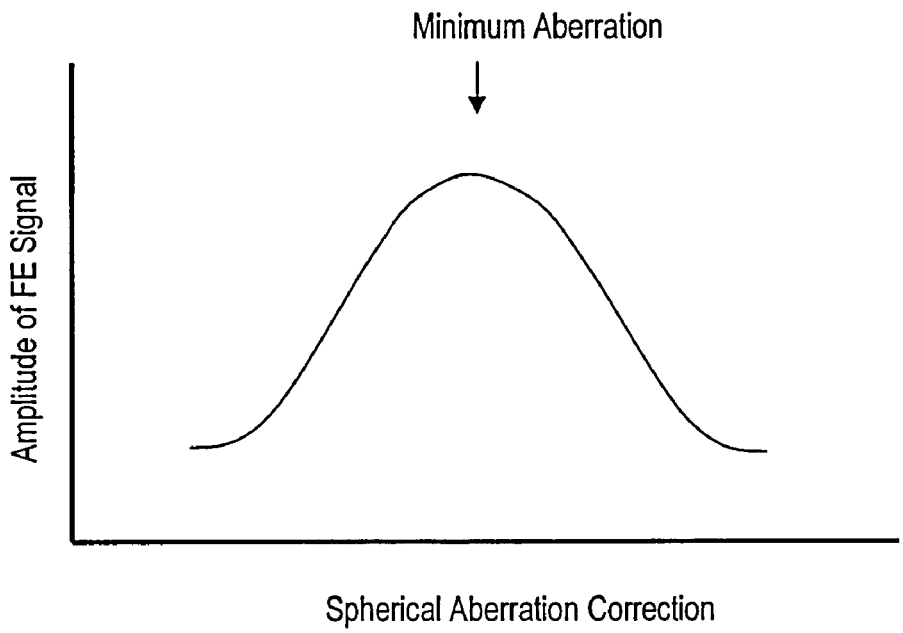
Figure 11B:
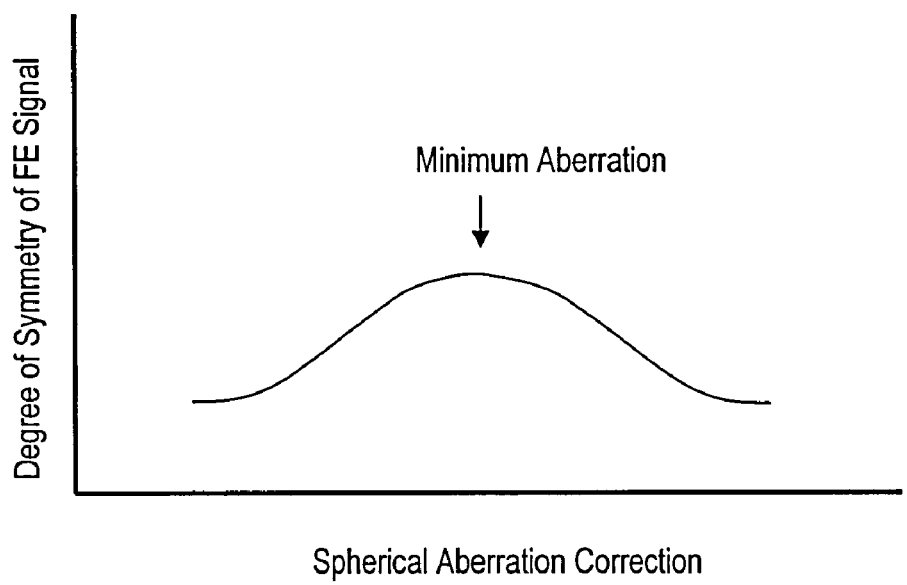

FIGS. 11A and 11B are graphs respectively showing the amplitude and degree of symmetry of an FE signal detected from a BD using a BD optical system.

Figure 12A:
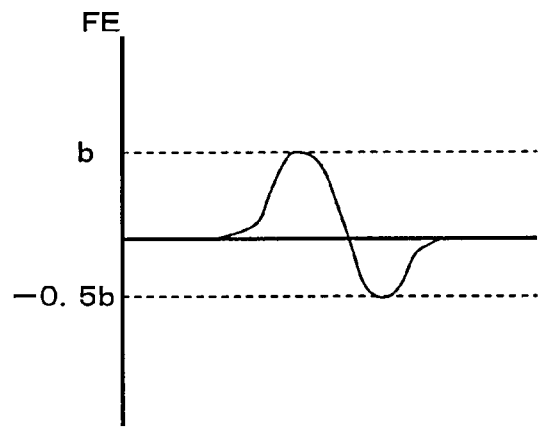
Figure 12B:
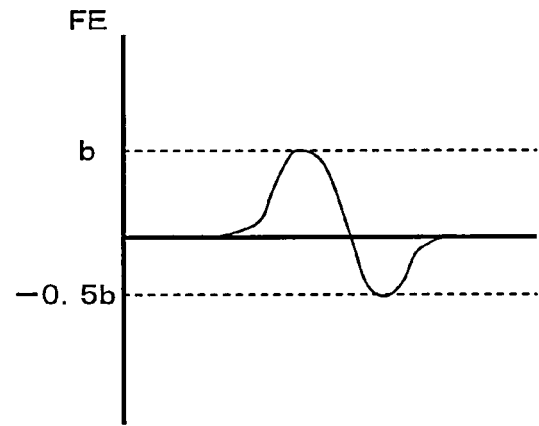
Figure 12C:
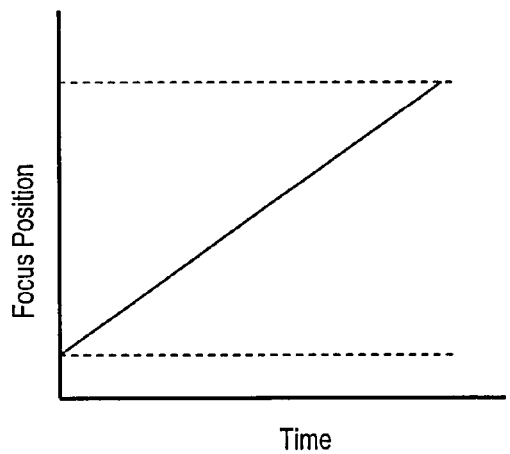
Figure 12D:
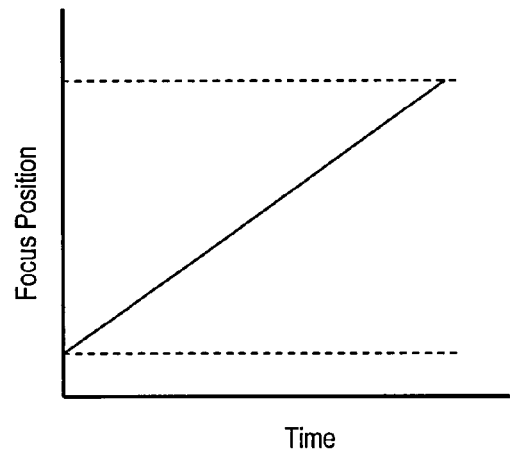

FIG. 12 is graphs showing the waveforms of FE signals detected from a DVD and a CD using the BD optical system, wherein:

FIGS. 12A and 12B show the waveforms of FE signals that were obtained at mutually different magnitudes of correction on spherical aberration, and FIGS. 12C and 12D are graphs showing the focus positions (i.e., the positions in the optical reference axis direction) of a light beam to irradiate the optical disk.

Figure 13:
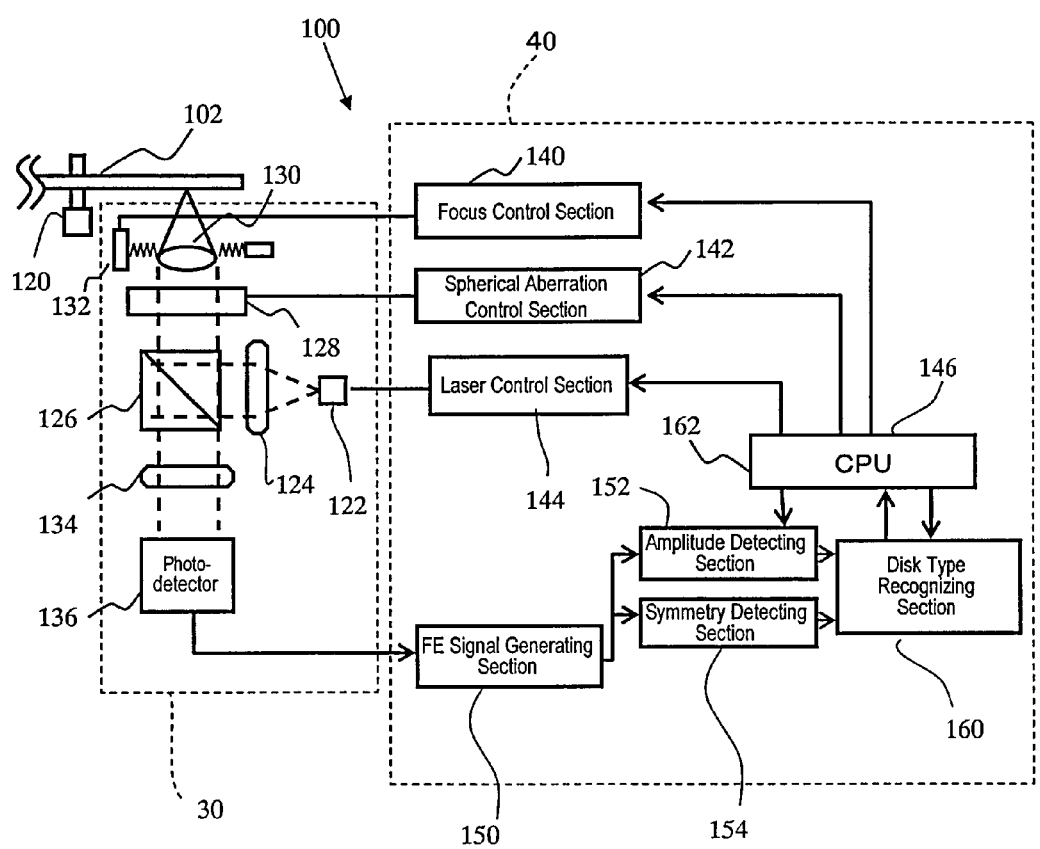

FIG. 13 shows an exemplary configuration for an optical disk drive according to a first preferred embodiment of the present invention.

Figure 14:
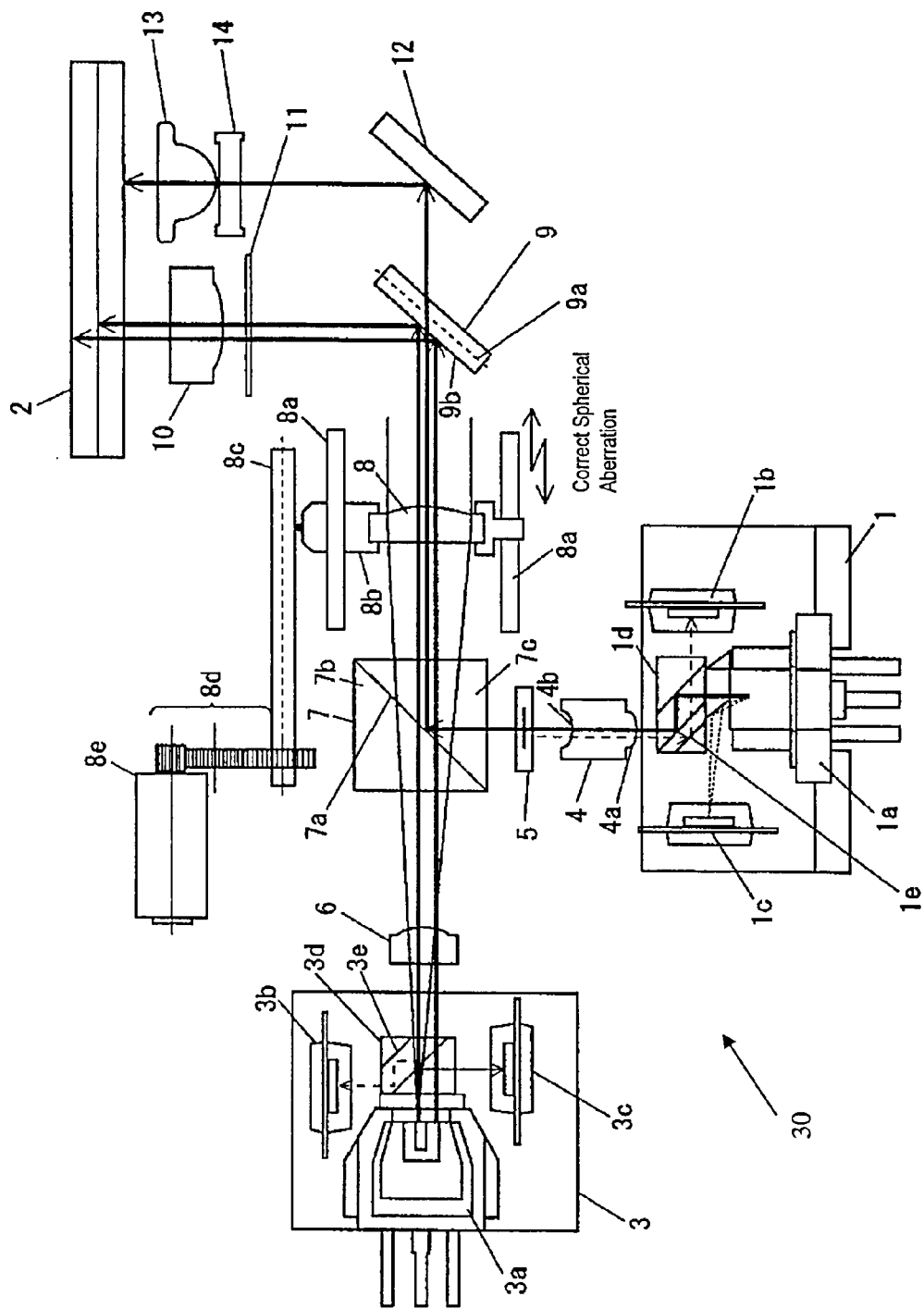

FIG. 14 shows an exemplary configuration for the optical pickup 30 of the first preferred embodiment.

Figure 15:
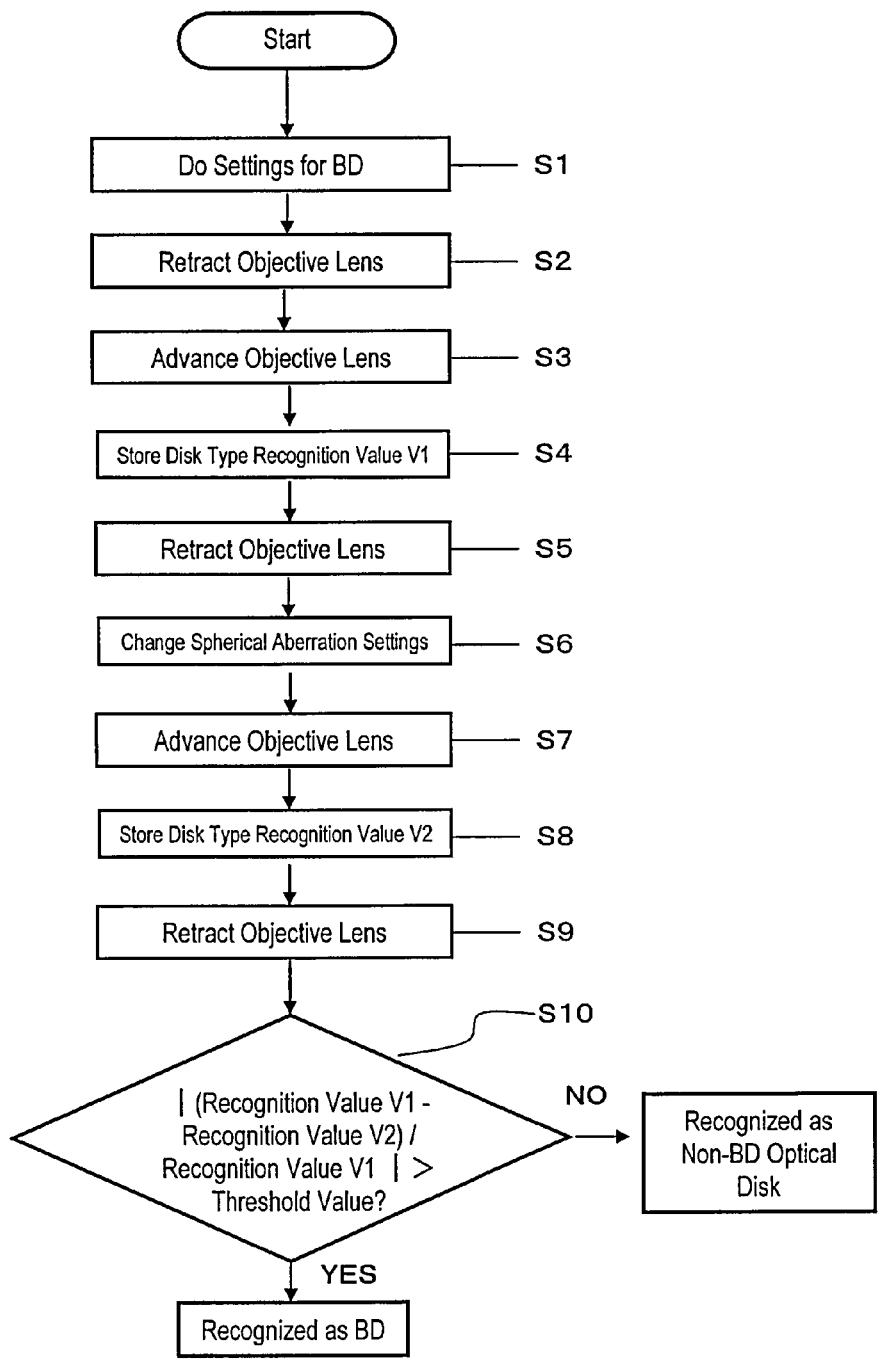

FIG. 15 is a flowchart showing the procedure of disk type recognition processing according to the first preferred embodiment.

FIGS. 16A and 16B, corresponding to FIGS. 7A and 7B, respectively, show small S-curves detected from the surface of a BD and FIGS. 16C and 16D show small S-curves detected from the surface of a DVD.

Figure 17:
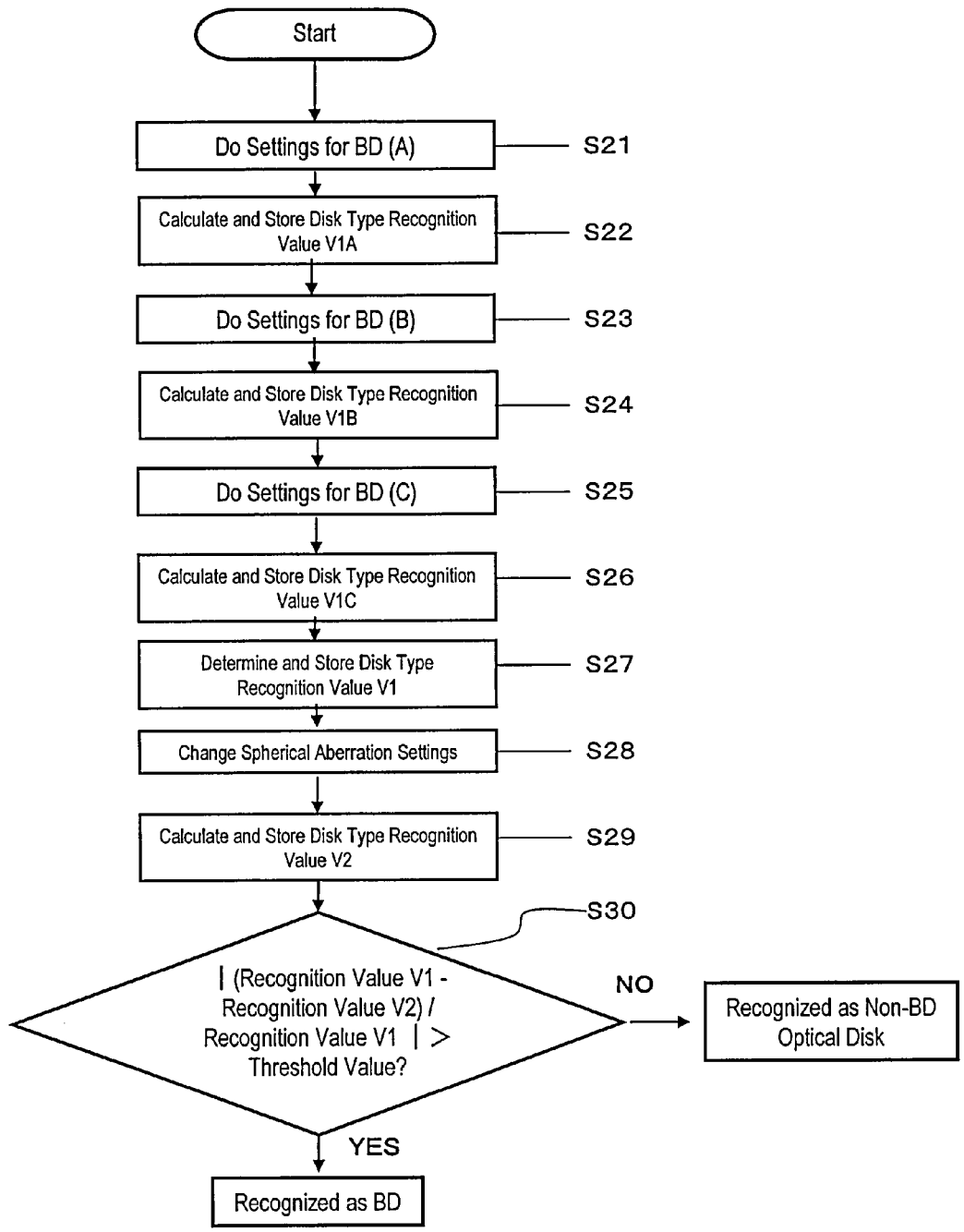

FIG. 17 is a flowchart showing the procedure of disk type recognition processing according to a second preferred embodiment of the present invention.

Figure 18:
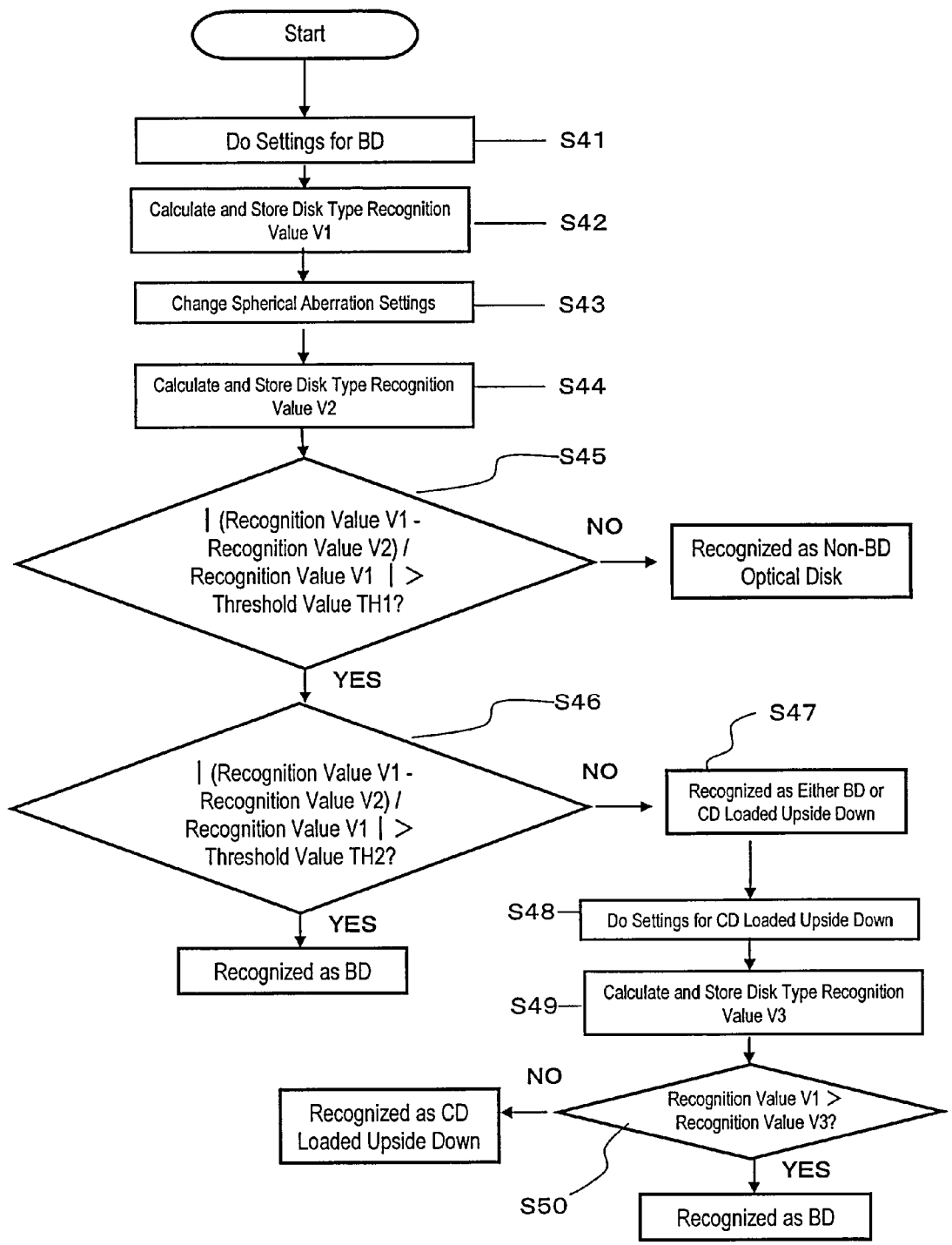

FIG. 18 is a flowchart showing the procedure of disk type recognition processing according to a fourth preferred embodiment of the present invention.

Figure 19A:
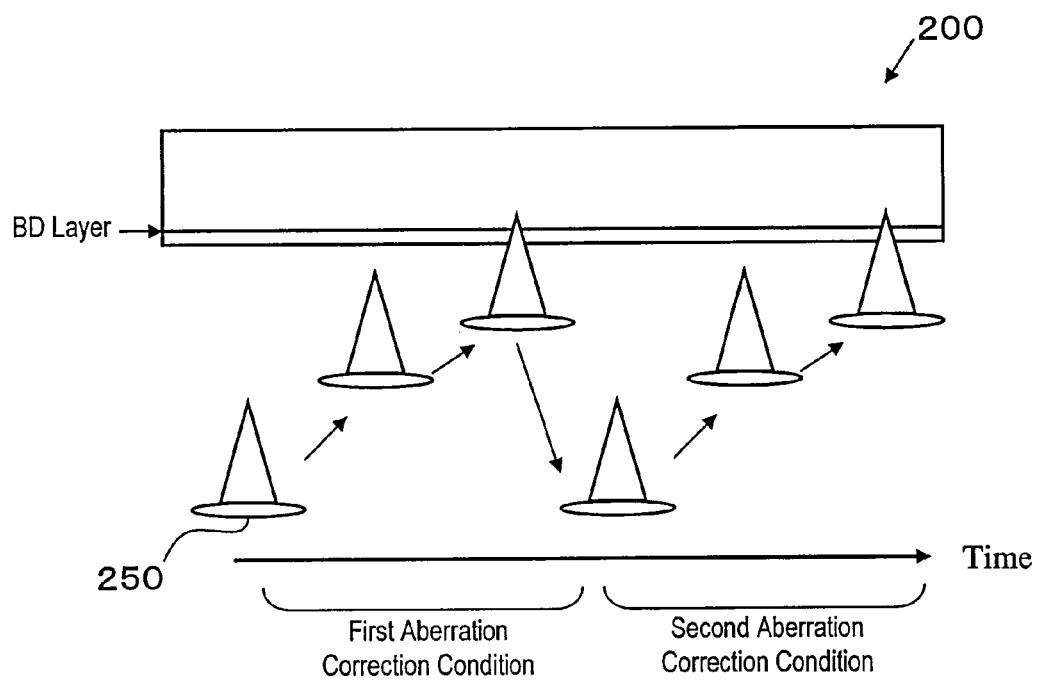
Figure 19B:
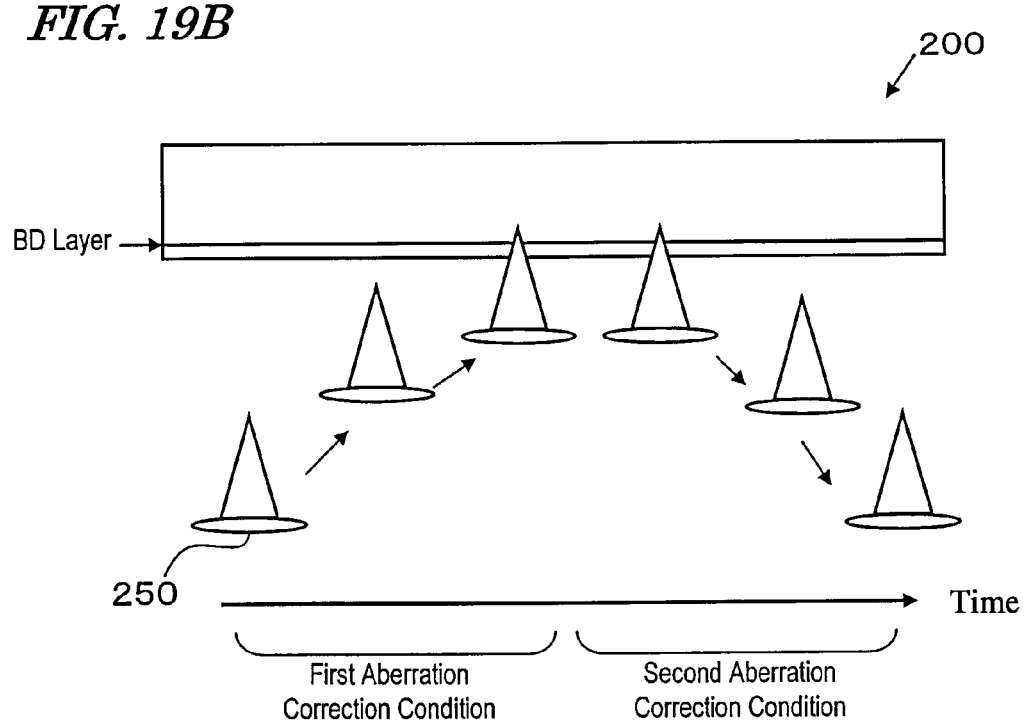

FIGS. 19A and 19B show typical timings to change aberration correction conditions.

Figure 20:
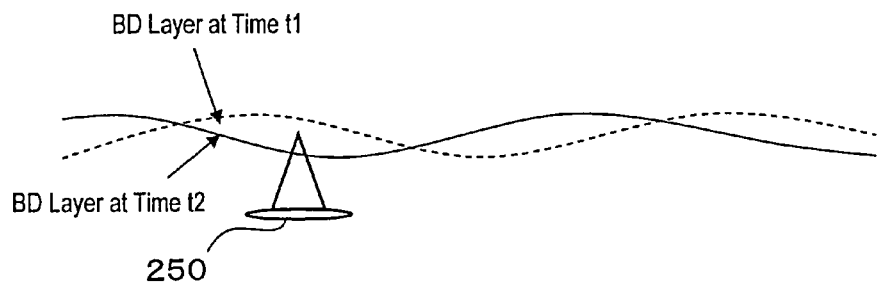

FIG. 20 shows the out-of-plane vibrations of an optical disk.

Figure 21A:
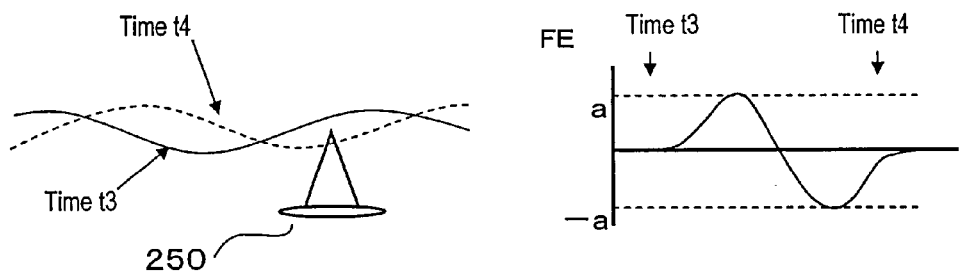
Figure 21B:
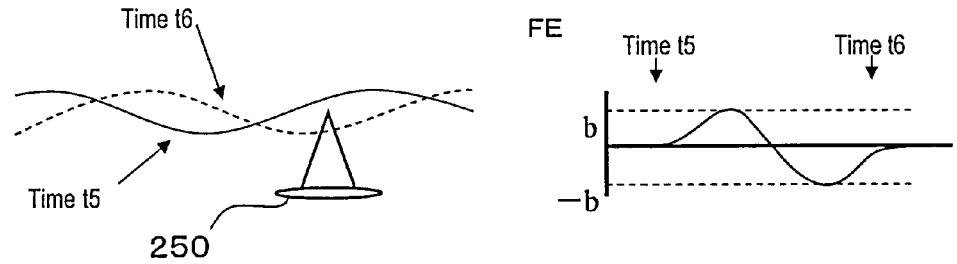

FIGS. 21A and 21B show how to perform disk type recognition according to a seventh preferred embodiment of the present invention.

Figure 22A:
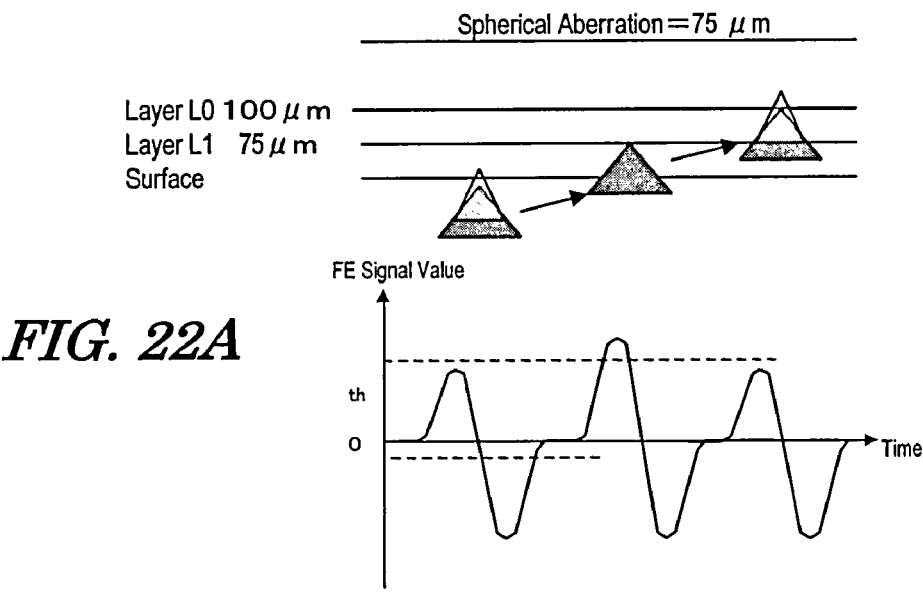
Figure 22B:
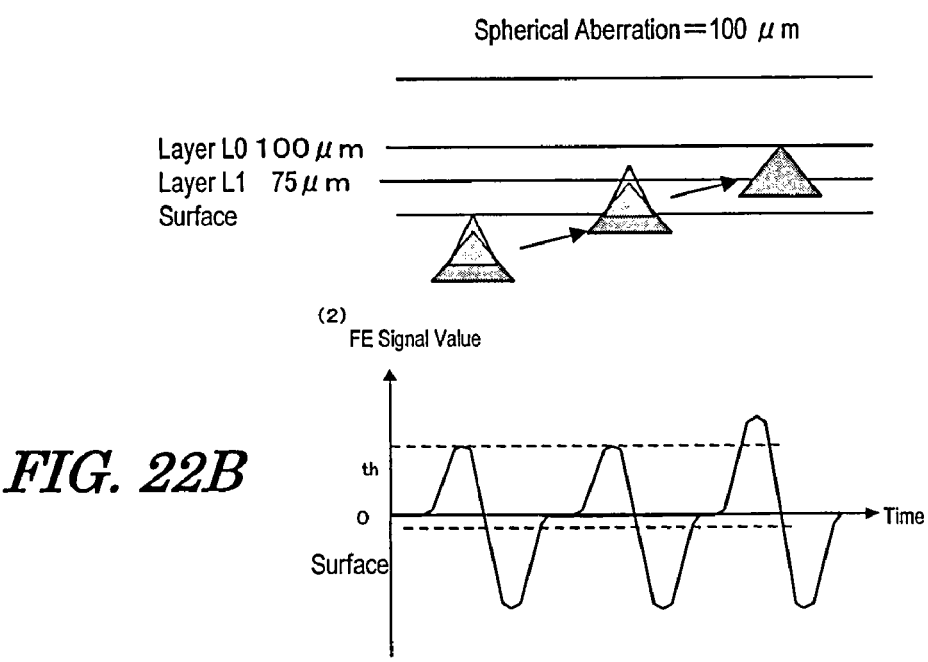

FIGS. 22A and 22B show how to perform disk type recognition according to an eighth preferred embodiment of the present invention.

Figure 23:
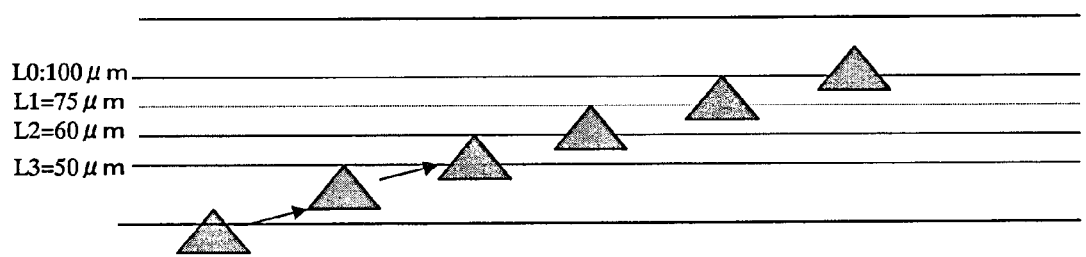

FIG. 23 shows how to perform disk type recognition according to a ninth preferred embodiment of the present invention.

Figure 24:
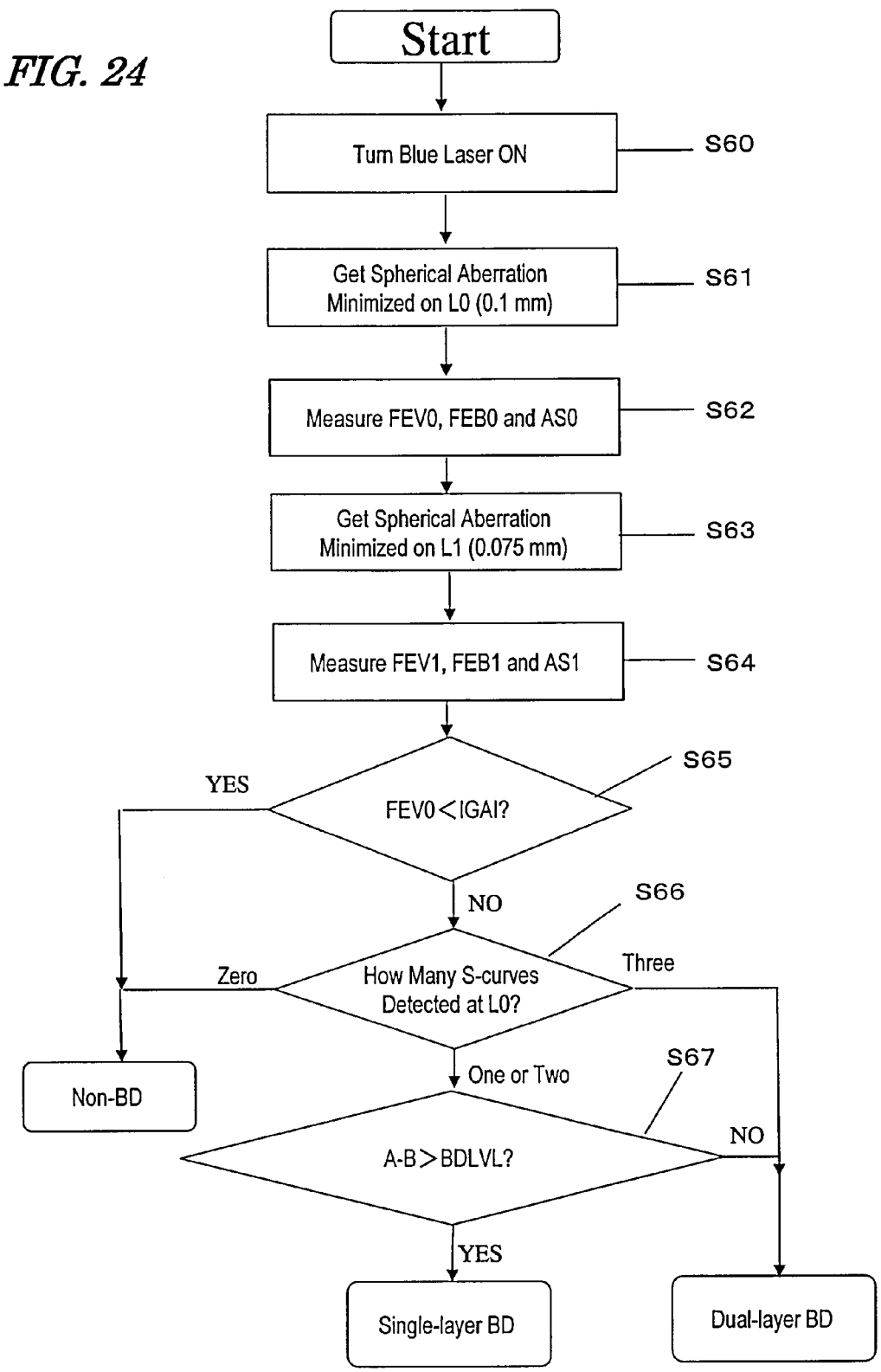
Figure 25:
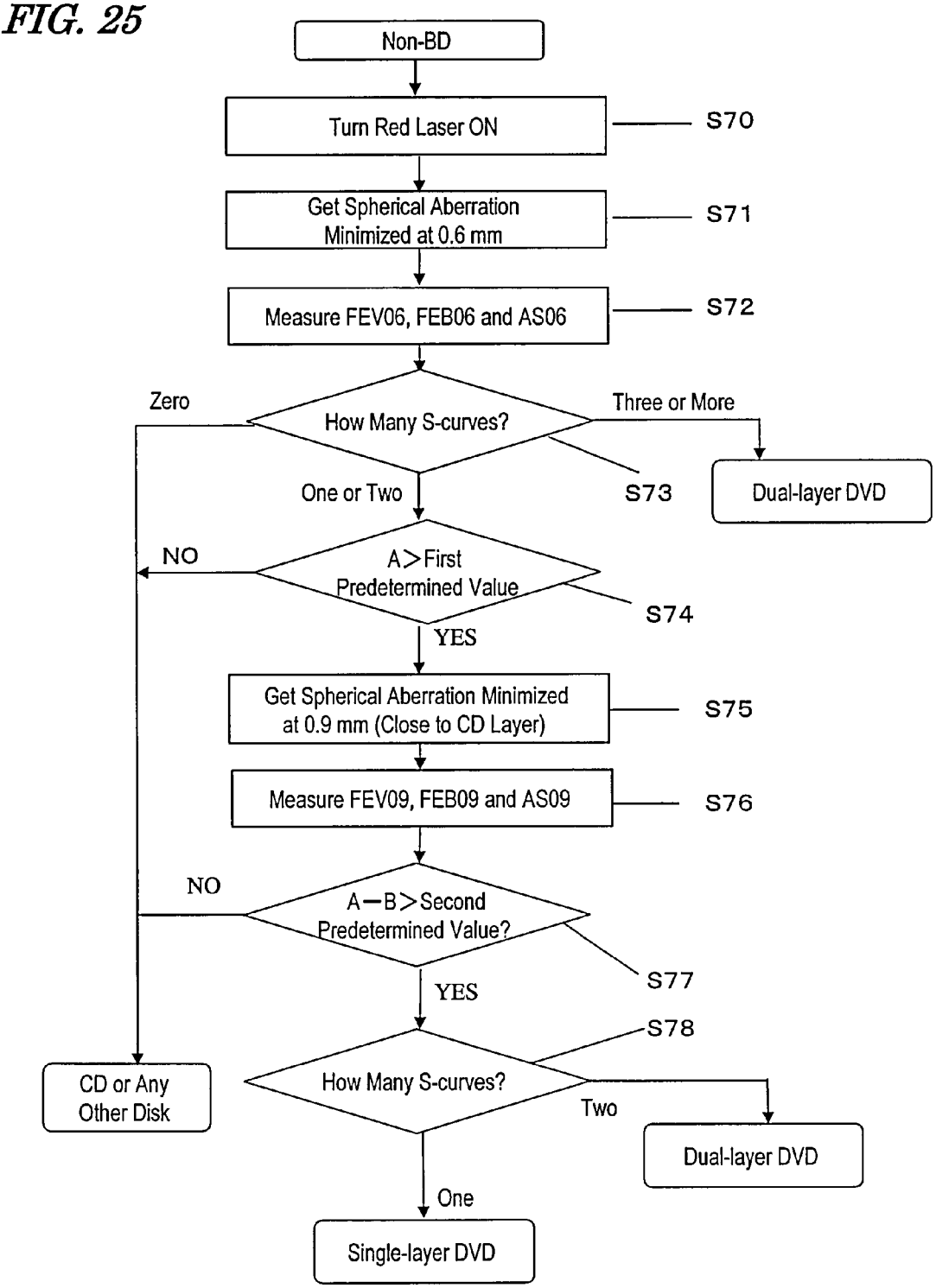
Figure 26:
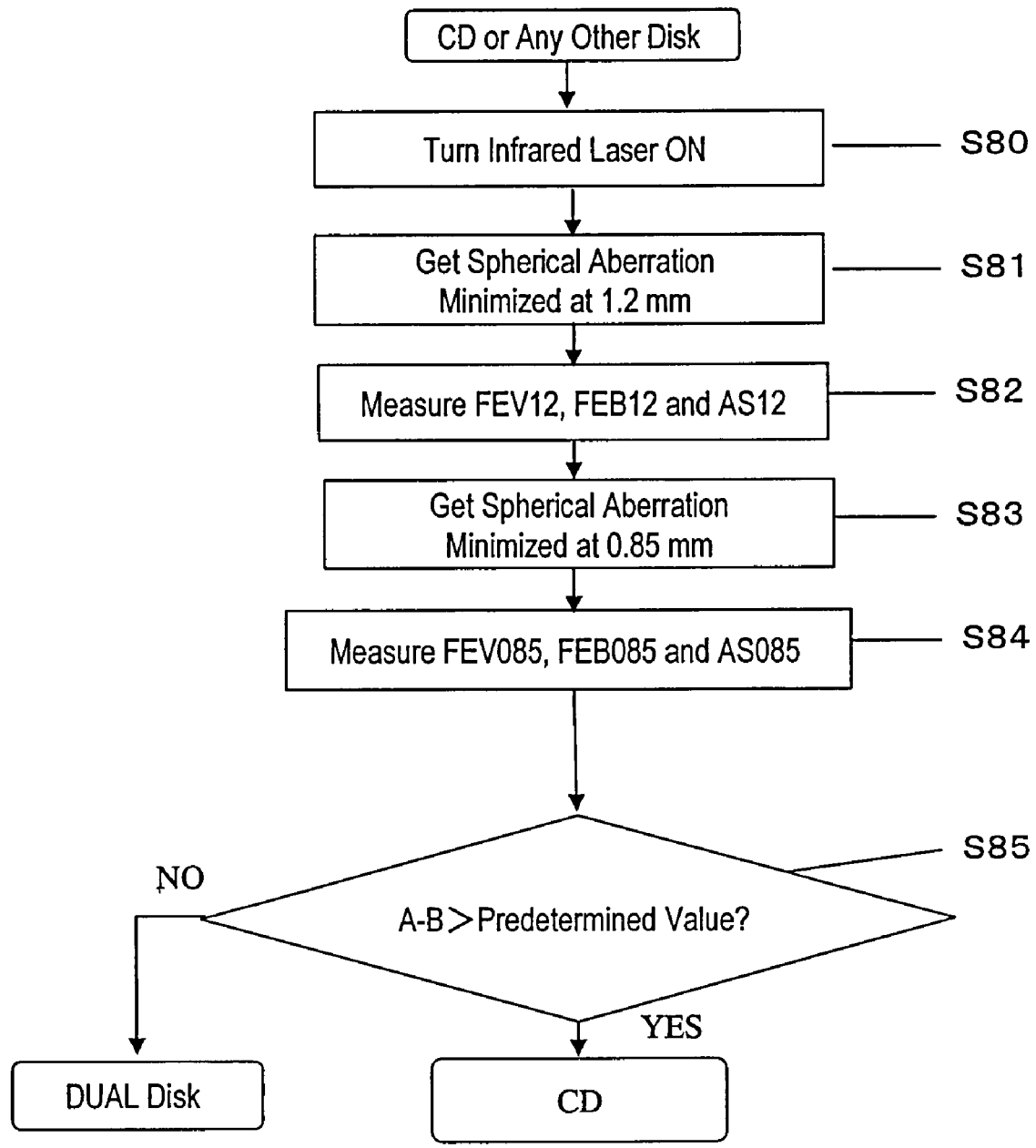

FIGS. 24, 25 and 26 are flowcharts showing how to perform disk type recognition according to a tenth preferred embodiment of the present invention.

Figure 27A:
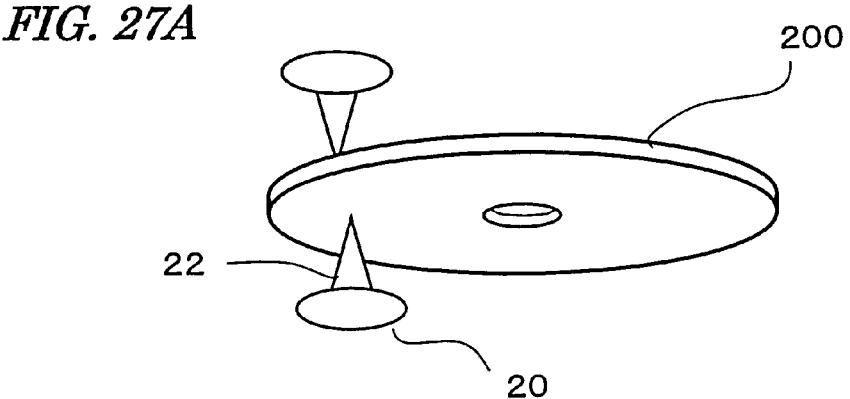
Figure 27B:
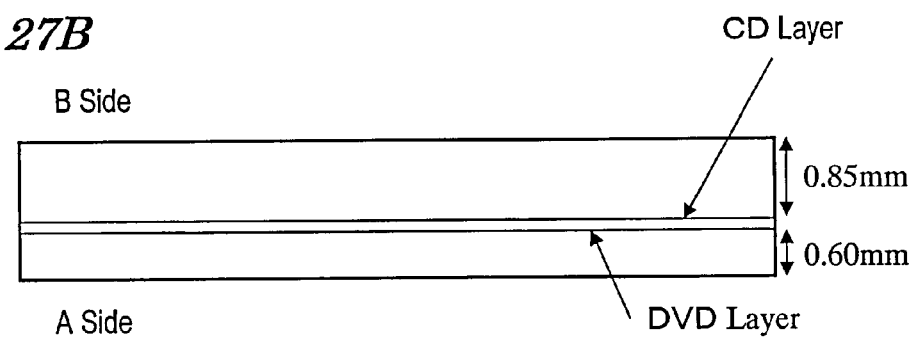

FIGS. 27A and 27B are respectively a perspective view and a cross-sectional view illustrating the structure of a DUAL disk for use in disk type recognition according to the tenth preferred embodiment.

DETAILED DESCRIPTION OF PREFERRED EMBODIMENTS

An optical disk drive that can read and write data from/on a BD includes a mechanism for correcting spherical aberration (which will be referred to herein as a "spherical aberration correcting section") between a light source that radiates a light beam to irradiate the BD and an objective lens that converges the light beam. As shown in FIG. 4A, the "spherical aberration" refers to a phenomenon that the focus position shifts in the optical reference axis direction between a light ray passing through the central portion of an objective lens 250 and a light ray passing through the peripheral portion of the objective lens 250. Thus, the "spherical aberration" sometimes means only the magnitude of that shift. The spherical aberration is variable with the wavelength of the light beam, the numerical aperture (NA) of the objective lens and the transmission stack thickness of the optical disk (i.e., the distance from the surface of the disk to the information storage layer). Among other things, the spherical aberration depends on the numerical aperture particularly heavily, and changes proportionally to the fourth power of NA. That is why a BD that uses a lens with a larger NA than a DVD or a CD is likely to cause a significant spherical aberration, which must be reduced in one way or another.

As used herein, the term "transmission stack thickness" means the distance from the surface of the disk to the information storage layer, i.e., the depth of the information storage layer as measured from the surface of the disk. In a single-layer BD including one information storage layer, the information storage layer is covered with a light-transmitting layer (a coating layer) with a thickness of 0.1 mm, and therefore, its transmission stack thickness is invariably defined at 0.1 mm. As for a dual-layer BD including two information storage layers, one of the two information storage layers that is more distant from the disk surface (i.e., layer L0) is covered with a light-transmitting layer with a thickness of 25 μm, on which the other information storage layer (layer L1) is arranged. And this layer L1 is covered with another light-transmitting layer (coating layer) with a thickness of about 0.075 mm. Therefore, the transmission stack thickness of the dual-layer BD is 0.1 mm (=100 μm) as for the layer L0 but is 0.075 mm (=75 μm) as for the layer L1.

It should be noted that even optical disks compliant with Blu-ray Disc Basic Format Specification could cause spherical aberrations of significantly different magnitudes just because the thicknesses of their transmission stack are different or because the optical disks are slightly tilted with respect to the optical reference axis. For that reason, the magnitude of correction to be made on the aberration needs to be optimized by controlling the spherical aberration correcting section 260 such that the spherical aberration is minimized according to the specification of the optical disk that has been loaded into the optical disk drive. FIG. 4B schematically illustrates how the spherical aberration has been corrected substantially perfectly by the spherical aberration correcting section 260.

FIG. 5A illustrates how the spherical aberration is minimized on an information storage layer that is located at relatively shallow level as measured from the surface of the optical disk. On the other hand, FIG. 5B illustrates how the spherical aberration is minimized on an information storage layer that is located at relatively deep level as measured from the surface of the optical disk. If the distance from the surface of a given optical disk to its information storage layer is changeable from one disk to another in this manner, then the spherical aberration needs to be minimized on the information storage layer by getting the degree of divergence of a light beam, which is going to enter the objective lens 250, regulated by the spherical aberration correcting section 260.

The spherical aberration correcting section 260 includes an aberration corrective collimator lens such as that shown in FIGS. 6A and 6B to regulate the degree of divergence of the light beam that is going to enter the objective lens 250, and can regulate the degree of divergence of the light beam by changing its positions in the optical reference axis direction.

In the state shown in FIG. 6A, the spherical aberration is minimized on the layer L0, which is located at the deeper level in the optical disk, by moving the aberration corrective collimator lens away from the objective lens 250. On the other hand, in the state shown in FIG. 6B, the spherical aberration is minimized on the layer L1, which is located at the shallower level in the optical disk, by moving the aberration corrective collimator lens toward the objective lens 250.

As shown in FIG. 6C, the depth of the information storage layer, on which the spherical aberration is minimized, can be changed by controlling the position of the aberration corrective collimator lens. For example, if the aberration corrective collimator lens is arranged at a position that is 1.66 mm farther away from the objective lens 250 than the driver center position is, the spherical aberration can be minimized on the layer L0. Meanwhile, if the aberration corrective collimator lens is arranged at a position that is 1.11 mm closer to the objective lens 250 than the driver center position is, then the spherical aberration can be minimized on the layer L1.

In this description, the distance from the surface of the optical disk to the layer L0 (i.e., the depth of the layer L0) will sometimes be referred to herein as a "transmission stack thickness of 100 μm" and the distance from the surface of the optical disk to the layer L1 (i.e., the depth of the layer L1) will sometimes be referred to herein as a "transmission stack thickness of 75 μm". That is why to form the focal point of the light beam on the layer L1, not just should the objective lens 250 be displaced in the optical reference axis direction but also should the aberration corrective collimator lens be displaced toward the objective lens by 1.11 mm with respect to the driver center position to correct the aberration appropriately for the transmission stack thickness of 75 μm. Also, to shift the focal point of the light beam from the layer L1 to the layer L0, not just should the objective lens 250 be displaced in the optical reference axis direction but also should the aberration corrective collimator lens be displaced away from the objective lens 250 by 1.66 mm with respect to the driver center position to correct the aberration appropriately for the transmission stack thickness of 100 μm. In this case, if only the objective lens 250 were displaced without correcting the aberration appropriately, then the light beam being converged on the layer L0 would have increased spherical aberration.

FIG. 7A schematically shows the S-curve of an FE signal detected from the information storage layer of a single-layer BD (which will be referred to herein as a "BD layer with a transmission stack thickness of 100 μm") when the focus position is moved upward under a condition that minimizes the spherical aberration at the transmission stack thickness of 100 μm. In the same way, FIG. 7B schematically shows the S-curve of an FE signal detected from the BD layer with the transmission stack thickness of 100 μm of the single-layer BD when the focus position is moved upward under a condition that minimizes the spherical aberration at the transmission stack thickness of 75 μm.

In FIG. 7A, the spherical aberration is minimized on the BD layer, and therefore, an S-curve with great amplitude is observed. On the other hand, since the spherical aberration is not minimized on the BD layer in FIG. 7B, only an S-curve with relatively small amplitude and a decreased degree of symmetry is observed.

FIG. 7C schematically shows the S-curve of an FE signal detected from the information storage layer of a single-layer DVD (which will be referred to herein as a "DVD layer") when the focus position is moved upward under a condition that minimizes the spherical aberration at the transmission stack thickness of 100 μm. In FIG. 7C, since the spherical aberration is not minimized on the DVD layer, either, only an S-curve with relatively small amplitude and a decreased degree of symmetry is observed.

As is clear from the foregoing description, if the spherical aberration correcting section 260 is set so as to minimize the spherical aberration under the situation where a light beam to read BDs has a wavelength of 400 nm to 410 nm (typically about 405 nm), the objective lens 250 has a numerical aperture of 0.84 to 0.86 (typically 0.85) and the optical disk base material (i.e., transmission stack) has a thickness of 100 μm, then the spherical aberration can be minimized for BDs but a spherical aberration is produced for the other types of optical disks. It should be noted that the light source and the objective lens that define the wavelength of the light beam and the numerical aperture of the objective lens, respectively, will be referred to herein as an "optical system" collectively for the sake of simplicity. For example, "to adopt an optical system for BDs" herein means irradiating an optical disk with a light beam having a wavelength of 400 nm to 410 nm using an objective lens having a numerical aperture of 0.84 to 0.86.

As described above, if the magnitude of correction on spherical aberration is changed by using the spherical aberration correcting section 260, then the waveform of an FE signal, for example, may or may not change according to the types of the optical system and optical disk. Thus, the present inventors acquired the basic idea of the present invention by discovering that the type of the given optical disk can be recognized by utilizing this phenomenon.

It should be noted that according to the present invention, when the magnitudes of correction on spherical aberration are changed, spherical aberration is produced intentionally in a certain correction state for an optical disk compatible with the light source and lens that are used to radiate the light beam. In another correction state, however, the spherical aberration is decreased compared to the spherical aberration that has been produced intentionally. The latter decreased spherical aberration is preferably as small as possible. Thus, in the following description, to decrease the spherical aberration to such a relatively low level will sometimes be expressed as "minimizing" the spherical aberration. Nonetheless, there is no need to adopt the minimum value of the spherical aberration in the strict sense but the spherical aberration just needs to be decreased to the point that a significant variation is sensible on the waveform of the FE signal, for example.

Hereinafter, the principle of disk type recognition according to the present invention will be described with reference to FIGS. 8 through 12.

First, referring to FIG. 8, shown are the S-curves of FE signals that were detected using an optical system for BDs in FIGS. 8A and 8B. More specifically, FIG. 8A shows the waveform that was obtained when the optical disk loaded into the optical disk drive was a BD, while FIG. 8B shows the waveform that was obtained when the optical disk loaded into the optical disk drive was a DVD. In both cases, the spherical aberration correcting section was set so as to minimize the spherical aberration for BDs.

FIGS. 8C and 8D are graphs showing the focus positions (i.e., the positions in the optical reference axis direction) of a light beam to irradiate the optical disk. As shown in FIGS. 8C and 8D, the focus position (i.e., the position of the focal point of the light beam) moves upward with time. In the situation shown in FIGS. 8C and 8D, the objective lens that had been located under the optical disk gradually accessed the optical disk with time and the focal point of the light beam crossed the information storage layer of the optical disk at some point in time. Before and after the focal point of the light beam crosses the information storage layer, the FE signal inverts its polarities.

Comparing the curves shown in FIGS. 8A and 8B with each other, it is clear that the FE signal had relatively large amplitude when the optical disk drive was loaded with a BD but had relatively small amplitude when the optical disk drive was loaded with a DVD. Also, the FE signal showed a relatively high degree of symmetry when the optical disk drive was loaded with a BD but showed a relatively low degree of symmetry when the optical disk drive was loaded with a DVD.

Thus, it can be seen that if the waveform of an FE signal is monitored with the BD optical system used and with the correction of spherical aberration optimized for BDs, the waveshape of the FE signal changes depending on whether the optical disk loaded into the optical disk drive is a BD or not.

The parameters that determine the waveform of the FE signal may be defined as follows by the amplitude and the degree of symmetry, for example.

First, suppose the S-curve of the FE signal has a maximum (voltage) value X1 and a minimum (voltage) value X2 as shown in FIG. 9. In that case, the amplitude of the FE signal is defined by X1−X2. On the other hand, the degree of symmetry may be defined by 1−(|X1+X2|/amplitude), for example.

In the waveform shown in FIG. 9, X2 has a negative value and its absolute value |X2| is approximately equal to the absolute value |X1| of X1 with a positive value. Thus, |X1+X2 | has a small value that is close to zero and the value of {1−(|X1+X2 |/amplitude)} representing the degree of symmetry is close to one. Meanwhile, if |X2| is much smaller than |X1 |, then the difference between |X1+X2| and |X1−X2 | decreases so much that the value of {1−(|X1+X2 |/amplitude)} representing the degree of symmetry goes closer to zero. The same statement applies even if |X1| is much smaller than |X2|.

The waveform shown in FIG. 8A has an amplitude of 2*a* and a degree of symmetry of 1, while the waveform shown in FIG. 8B has an amplitude of 1.2a and a degree of symmetry of approximately 0.8. In this manner, by measuring and evaluating the waveform of the FE signal quantitatively, the variation in the waveform of the FE signal can be sensed.

FIG. 10 is a graph showing how the amplitude of an FE signal detected from an optical disk changes with the transmission stack thickness of the optical disk. The amplitude of this FE signal is obtained by using the BD optical system and by regulating the spherical aberration correcting section such that the spherical aberration is minimized with respect to BDs. That is why if the transmission stack thickness is equal to that of BDs (of approximately 0.1 mm), the amplitude maximizes. However, if the transmission stack thickness is equal to that of a DVD or a CD, the amplitude decreases.

FIGS. 11A and 11B are graphs respectively showing the amplitude and degree of symmetry of an FE signal detected from a BD using a BD optical system. If the magnitude of correction on spherical aberration has been set to the best value for BDs, the FE signal has relatively large amplitude and a relatively high degree of symmetry. However, if the magnitude of correction on spherical aberration is shifted from the best value for BDs, then the FE signal has decreased amplitude and a decreased degree of symmetry.

As can be seen, if the amplitude and degree of symmetry of an FE signal, detected from a BD, are measured using the BD optical system, then the amplitude and degree of symmetry can be sensed to vary as the magnitude of correction on spherical aberration is changed. On the other hand, if the amplitude and degree of symmetry of an FE signal, detected from a non-BD optical disk (such as a DVD or a CD), are measured using the BD optical system, then the amplitude and degree of symmetry hardly change but maintain a small value and a low degree even if the magnitude of correction on spherical aberration is changed.

FIG. 12 is graphs showing the waveforms of FE signals detected from a DVD and a CD using the BD optical system. Specifically, FIGS. 12A and 12B show the waveforms of FE signals that were obtained at mutually different magnitudes of correction on spherical aberration. In this case, even if the magnitudes of correction on spherical aberration are changed within a predetermined range, the FE signals still maintain relatively small amplitudes and relatively low degrees of symmetry and no significant variations are sensed. In the example shown in FIG. 12, the amplitude was 1.5b and the degree of symmetry was approximately 0.67 in either case. Comparing the examples shown in FIGS. 8 and 12 with each other, it can be seen that b<a is satisfied.

As described above, according to the present invention, the amplitude and degree of symmetry of an FE signal are monitored for any variation when the magnitudes of correction to be made on spherical aberration are changed using an optical system that is compatible with a particular type of optical disk (e.g., a BD). And if the amplitude or degree of symmetry is sensed to have varied significantly with the change in the magnitude of correction on spherical aberration, then the optical disk loaded in the optical disk drive is recognized as an optical disk (e.g., a BD) compatible with the optical system. On the other hand, if no such variation is sensed, then it is determined that an optical disk that is not compatible with the optical system (e.g., a DVD or a CD) has been loaded in the optical disk drive now. The signal for use to make the disk type recognition does not have to be the FE signal but may also be a tracking error (TE) signal, a radio frequency (RF) read signal or any other suitable signal.

In the example described above, it is determined, by using the BD optical system, whether the optical disk now loaded in the optical disk drive is a BD or not. However, according to the present invention, the disk type recognition can also be made in the same way even by using a DVD optical system or a CD optical system.

Hereinafter, specific preferred embodiments of an optical disk drive according to the present invention will be described.

Embodiment 1

First, a first specific preferred embodiment of an optical disk drive according to the present invention will be described.

In this preferred embodiment, the amplitude and degree of symmetry of an FE signal are monitored, and a disk type recognition value is calculated, by setting an aberration correction condition that no spherical aberration is produced at a transmission stack thickness of 0.1 mm (which is equal to the transmission stack thickness of BDs). Next, after the aberration correction condition has been modified such that no spherical aberration is produced at a transmission stack thickness of 0.12 mm (which is outside of the transmission stack thickness range of BDs), the amplitude and degree of symmetry of an FE signal are monitored again and a disk type recognition value is calculated one more time.

And if the disk type recognition value that has been figured out in this manner has varied by more than a predetermined percentage (which will be referred to herein as a "threshold value"), then the optical disk is recognized as a BD. Otherwise (i.e., if the disk type recognition value has varied by the predetermined value or less), then the given optical disk is recognized as a non-BD.

In the BD optical system, the objective lens has a focal length as short as about 0.4 mm, and therefore, cannot focus the light beam on the information storage layer of a DVD or a CD, which is located at a deep level as measured from the surface of the disk. That is why if the disk type recognition operation is carried out on a DVD or a CD using the BD optical system, the FE signal and other signals are generated, and the disk type recognition value is calculated, based on the light that has been reflected from the surface of the disk (i.e., at a transmission stack thickness of 0 mm).

Configuration for Optical Disk Drive

Hereinafter, a configuration for an optical disk drive according to this preferred embodiment will be described with reference to FIG. 13, which shows a configuration for the optical disk drive 100 of this preferred embodiment.

The optical disk drive 100 shown in FIG. 13 can be roughly classifiable into the two major blocks of an optical pickup 30 and an optical disk controller 40 and a disk motor 120.

The optical pickup 30 includes an optical system for irradiating the information storage layer (not shown in FIG. 13) of an optical disk 102, which has been loaded into this optical disk drive 100, with a light beam. The optical pickup 30 receives the light beam that has been reflected from the optical disk 102 in a predetermined photosensitive area and outputs an electrical signal representing the intensity of the light that has been received in the photosensitive area.

The optical disk controller 40 controls the major operations of the optical disk drive 100 and is preferably implemented as a single or multiple semiconductor chips (IC chips). In response to the electrical signal supplied from the optical pickup 30, the optical disk controller 40 generates various control signals, thereby focusing the light beam on the information storage layer of the optical disk 102 and performing a focus control and a tracking control. Also, the optical disk controller 40 reads data from the optical disk 102, performs error correction and other types of processing on the data, and outputs it as a read signal. The various types of processing done by the optical disk controller 40 may be carried out exclusively by means of hardware but may also be realized by either software only or a combination of software and hardware. The computations to recognize the type of the given disk by measuring the amplitude of the FE signal are preferably carried out as digital signal processing, for example.

Hereinafter, these components will be described in further detail one by one.

First, the configuration of the optical pickup will be described. The optical pickup 30 shown in FIG. 13 includes a light source 122, a coupling lens 124, a polarization beam splitter 126, a spherical aberration corrector 128, an objective lens 130, an actuator 132, a condenser lens 134 and a photodetector 136.

The light source 122 is implemented as a semiconductor laser for radiating a light beam. Only one light source 122 is illustrated in FIG. 13 for the sake of simplicity. Actually, however, the light source may include three semiconductor lasers that radiate light beams with mutually different wavelengths. More specifically, the single optical pickup preferably includes multiple semiconductor lasers for radiating light beams with mutually different wavelengths for CDs, DVDs and BDs, respectively. In FIG. 13, those light sources are combined into the single light source 122 for convenience sake.

The coupling lens 124 transforms the light beam that has been radiated from the light source 122 into a parallel beam. The polarization beam splitter 126 reflects the parallel beam that has come from the coupling lens 124. Since the position of the semiconductor laser in the light source 122 and the wavelength of the light beam to be radiated change according to the type of the optical disk, the best configuration of the optical system also changes according to the type of the optical disk 102. That is why the configuration of the optical pickup 30 is actually more complicated than the illustrated one.

The objective lens 130 converges the light beam that has been reflected from the polarization beam splitter 126. The actuator 132 controls the position of the objective lens 130 to a predetermined one based on the FE and TE signals. In reading or writing data from/on the information storage layer of the optical disk 102, the focal point of the light beam that has been converged by the objective lens 130 is located on the information storage layer, thereby forming a light beam spot on the information storage layer. Only one objective lens 130 is shown in FIG. 13. Actually, however, multiple objective lenses 130 need to be provided and used selectively according to the type of the given optical disk 102. In reading and writing data, the focus servo and tracking servo are turned ON and the position of the objective lens 130 is controlled precisely such that the focal point of the light beam follows the target track on the information storage layer.

In this preferred embodiment, after the optical disk 102 has been loaded into the optical disk drive 100 and before the operation of reading or writing data is started, a disk type recognition operation is carried out to recognize the type of the given optical disk 102. When the disk type recognition operation is carried out, the position of the objective lens 130 is changed significantly along the optical reference axis by the actuator 132.

The spherical aberration correcting section 128 may include a corrective collimator lens (not shown), of which the position can be changed in the optical reference axis direction, for example, and may have a beam expander structure in which the spherical aberration states (corresponding to the magnitudes of correction) can be changed by adjusting the position of the corrective collimator lens. However, the spherical aberration correcting section 128 does not have to have such a beam expander structure, but may also have a configuration for correcting the aberration using a liquid crystal element, for example.

The light beam that has been reflected from the information storage layer of the optical disk 102 passes the objective lens 130, spherical aberration correcting section 128 and polarization beam splitter 126 and then enters the condenser lens 134, which converges, onto the photodetector 136, the light beam that has been reflected from the optical disk 102 and then transmitted through the objective lens 130 and the polarization beam splitter 126. On receiving the light that has been transmitted through the condenser lens 134, the photodetector 136 converts the optical signal into various electrical signals (e.g., current signals). The photodetector 136 may be a quadruple photodetector with four photosensitive areas, for example.

Hereinafter, a more detailed configuration for the optical pickup 30 that can be used effectively in this preferred embodiment will be described with reference to FIG. 14.

The optical pickup 30 shown in FIG. 14 includes a short-wavelength optical unit 1 and a long-wavelength optical unit 3. The light beams are radiated from these optical units 1 and 3 toward the optical disk 2 by way of a spherical aberration correcting section. These optical units 1 and 3 correspond to the light source 122 shown in FIG. 13.

The short-wavelength optical unit 1 includes a light source 1a that radiates a light beam with a wavelength of about 405 nm, a signal-detecting photodetector 1b to receive the light that has been reflected from the optical disk 2, another photodetector 1c to monitor the intensity of the light of the light source 1a, and an optical element 1d. The light source 1a includes a nitride semiconductor laser (not shown) that radiates a blue-violet laser beam. The light beam radiated from the light source 1a enters the optical element 1d. Part of the light beam is reflected from the optical element 1d toward the photodetector 1c, but most of the light beam radiated from the light source 1a is transmitted through the optical element 1d and directed toward the optical disk 2.

The light beam that has gone out of the short-wavelength optical unit 1 passes through a beam shaping lens 4 that compensates for the astigmatism of the short-wave light beam. The beam shaping lens 4 includes a convex portion 4a and a concave portion 4b at both ends thereof. The outgoing light of the short-wavelength optical unit 1 enters the lens 4 through the convex portion 4a thereof and leaves the lens 4 through the concave portion 4b thereof. The light beam that has gone out of the beam shaping lens 4 is transmitted through another optical element 5 and then incident on a beam splitter 7.

On the other hand, the long-wavelength optical unit 3 includes a light source 3a that radiates a light beam with a wavelength of about 660 nm for DVDs and a light beam with a wavelength of about 780 nm for CDs, a signal-detecting photodetector 3b to receive the light that has been reflected from the optical disk 2, another photodetector 3c to monitor the intensity of the light of the light source 3a, and an optical element 3d. In this example, the light source 3a includes just one semiconductor laser. Alternatively, the light source 3a may include two semiconductor lasers to radiate laser beams with mutually different wavelengths.

The light beam radiated from the light source 3a enters the optical element 3d. Part of the light beam is reflected from the optical element 3d toward the photodetector 3c, but most of the light beam radiated from the light source 3a is transmitted through the optical element 3d and directed toward the optical disk 2.

The light radiated from the long-wavelength optical unit 3 is transmitted through a relay lens 6 and then incident on the beam splitter 7. The relay lens 6 is provided to guide the outgoing light of the long-wavelength optical unit 3 toward the beam splitter 7 efficiently.

The beam splitter 7 consists of two bonded transparent members 7b and 7c. A tilted plane 7a is defined between the two transparent members 7b and 7c and includes a wavelength selective film. On the tilted plane 7a of the transparent member 7c on which the light radiated from the short-wavelength optical unit 1 is incident, the wavelength selective film is deposited directly. The beam splitter 7 reflects the short-wave light that has been radiated from the short-wavelength optical unit 1 and transmits the outgoing light of the long-wavelength optical unit 3. That is to say, the beam splitter 7 performs the function of guiding the outgoing light of the short-wavelength optical unit 1 and that of the long-wavelength optical unit 3 in substantially the same direction.

The light that has left the beam splitter 7 is transmitted through the corrective collimator lens 8 of the spherical aberration correcting section and then directed toward the optical disk 2. The corrective collimator lens 8 is secured to a slider 8b, which is in turn fitted slidably into a pair of supporting members 8a that are arranged substantially parallel to each other. A lead screw 8c with helical grooves is arranged substantially parallel to the supporting members 8a. A protrusion that engages with the grooves of the lead screw 8c is provided at the end of the slider 8b. The lead screw 8c is coupled to a group of gears 8d, which are connected to a stepping motor 8e. The driving force of the stepping motor 8e is transmitted to the lead screw 8c by way of the group of gears 8d, thereby driving the lead screw 8c. As a result, the slider 8b moves along the supporting members 8a. By controlling the operation of the stepping motor 8e in this manner, the corrective collimator lens 8 can be moved either toward, or away from, the beam splitter 7. And by changing the positions of the corrective collimator lens 8 back and forth along the optical reference axis in this way, the spherical aberration states of the light beam being radiated toward the optical disk can be changed, and the spherical aberration can be corrected as a result. In this case, the magnitude of correction on the spherical aberration corresponds to the magnitude of displacement of the corrective collimator lens 8. That is to say, the "state" of the spherical aberration correcting section is defined by the position of the corrective collimator lens 8.

By detecting the light beam that has been reflected from the optical disk while displacing the corrective collimator lens 8 along the optical reference axis, the degree of the spherical aberration can be estimated. For example, by reference to the waveform of an FE signal representing the light beam that has been actually reflected from the optical disk, it can be determined where the corrective collimator lens 8 should be located in order to minimize the spherical aberration. The position of the corrective collimator lens 8 where the spherical aberration is minimized changes with the specification of the optical system and the transmission stack thickness of the optical disk 2 as described above. The magnitude of correction on spherical aberration (corresponding to the magnitude of displacement of the corrective collimator lens 8) to be determined by a particular combination of optical system and transmission stack thickness may slightly vary from one optical disk drive to another. However, the exact correlation among the optical system, the transmission stack thickness and the magnitude of correction on spherical aberration may be defined and stored as a table of data, for example, in a memory of the optical disk drive just before the drive is shipped.

The light that has been transmitted through the corrective collimator lens 8 enters a high reflecting mirror 9. A quarter-wave member 9a to act on the short-wave light is provided for the high-reflecting mirror 9 and has the function of rotating the polarization direction of the returning light approximately 90 degrees from that of the approaching light. A wavelength selective film 9b is provided on the surface of the high-reflecting mirror 9 so as to receive the light that has come from the respective optical units 1 and 3. The wavelength selective film 9b reflects almost all of the long-wave light that has come from the long-wavelength optical unit 3 and transmits almost all of the short-wave light that has come from the short-wavelength optical unit 1.

The long-wave light that has been reflected by the high-reflecting mirror 9 enters an objective lens 10 for the long-wave laser, which converges the light that has been reflected from the high-reflecting mirror 9 onto the optical disk 2. The optical elements 11 arranged between the objective lens 10 and the high-reflecting mirror 9 include an aperture filter that realizes a numerical aperture for DVDs and CDs, a polarization hologram to process the light with a wavelength of about 660 nm, and a quarter-wave plate. The polarization hologram diffracts the light with a wavelength of 660 nm, thereby splitting the light into bundle of rays to generate a TE signal and an FE signal. The quarter-wave plate rotates the polarization direction of the returning light with a wavelength of about 660 nm or about 780 nm approximately 90 degrees from that of the approaching light.

Meanwhile, the short-wave light that has been transmitted through the high-reflecting mirror 9 is incident on another high-reflecting mirror 12, which includes a reflective film that reflects almost all of the short-wave light. The objective lens 13 converges the light that has been reflected from the high-reflecting mirror 12 onto the optical disk 2. An achromatic diffraction lens 14 is arranged between the objective lens 13 and the high-reflecting mirror 12 in order to reduce the chromatic aberration that has been produced by the respective optical elements on the short-wave light being transmitted.

After having been reflected from the optical disk 2, the short-wave light and the long-wave light will return to the short-wavelength optical unit 1 and the long-wavelength optical unit 3, respectively, through their respective return paths in the opposite direction.

Specifically, the short-wave light that has been reflected from the optical disk 2 enters the short-wavelength optical unit 1 by way of the optical element 5 and the beam-shaping lens 4. The optical element 5 splits the light reflected from the optical disk 2 into a plurality of light beams mainly for the purpose of generating a TE signal. These light beams are transmitted through the optical element 1d and then incident on the photodetector 1b, where the light beams are converted into electrical signals. The FE signal, TE signal, and RF signals are generated based on these electrical signals. That is why the light reflected from the optical disk 2 is split by the hologram 1e into a number of diffracted light beams, which will be incident on the predetermined area of the photodetector 1b.

On the other hand, the long-wave light that has been reflected from the optical disk 2 is transmitted through the optical element 3d and then incident on the photodetector 3b, where the light beams are converted into electrical signals. The FE signal, TE signal, and RF signals are generated based on these electrical signals. That is why the optical element 3d includes a hologram 3e that splits the light reflected from the optical disk 2 into a number of diffracted light beams and then guides those light beams onto a predetermined area of the photodetector 3b to generate an FE signal for CDs.

The optical pickup 30 for use in the optical disk drive of this preferred embodiment does not have to have the configuration shown in FIG. 14. However, the configuration shown in FIG. 14 still contributes effectively to reducing the overall size of the optical pickup 30.

Next, the detailed configuration of the optical disk controller 40 will be described with reference to FIG. 13 again.

As shown in FIG. 13, the optical disk controller 40 includes a focus control section 140, a spherical aberration control section 142, and a laser control section 144. And the CPU 146 controls various operations of the optical pickup 30 using these control sections. The optical disk controller 40 further includes an FE signal generating section 150, an amplitude detecting section 152, a symmetry detecting section 154 and a disk type recognizing section 160.

The focus control section 140 drives the actuator 132 in accordance with the instruction given by the CPU 146, thereby moving the objective lens 130 to any arbitrary position along the optical reference axis.

In accordance with the instruction given by the CPU 146, the spherical aberration control section 142 controls the spherical aberration correcting section 128 into a predetermined setting. Specifically, in response to the control signal supplied from the spherical aberration control section 142, the stepping motor 8e shown in FIG. 14 operates so as to displace the corrective collimator lens 8 to a predetermined position. By changing the positions (i.e., the positions in the optical reference axis direction) of the corrective collimator lens 8, the spherical aberration state of the light beam can be regulated. In this example, the position of the corrective collimator lens 8 defines the state of the spherical aberration correcting section 128 shown in FIG. 13.

The laser control section 144 drives the light source 122 such that the light source 122 emits a light beam with predetermined power.

The FE signal generating section 150 generates an FE signal based on the electrical signals that have been supplied from multiple photosensitive areas of the photodetector 136. The method of generating the FE signal is not particularly limited. Thus, the FE signal may be generated by an astigmatism method, a knife edge method or even a spot sized detection (SSD) method. The output FE signal of the FE signal generating section 150 is supplied to the amplitude detecting section 152 and the symmetry detecting section 154.

The amplitude detecting section 152 measures the amplitude of the FE signal based on the difference between the maximum and minimum values thereof while the objective lens 130 is moving along the optical reference axis. On the other hand, the symmetry detecting section 154 evaluates the degree of symmetry of the FE signal based on the difference between the maximum and minimum values thereof while the objective lens 130 is moving along the optical reference axis.

The disk type recognizing section 160 determines, by the amplitude and degree of symmetry that have been detected by the amplitude detecting section 152 and the symmetry detecting section 154, whether or not the type of the optical disk currently loaded in the optical disk drive agrees with the type of the optical system now used, and notifies the CPU 146 of the result.

According to this preferred embodiment, the disk type recognition is carried out based on the product of the amplitude and the degree of symmetry, which is used as the disk type recognition value. Also, in accordance with the instruction given by the CPU 146, the disk type recognition value is calculated and stored for every setting of spherical aberration. And if the disk type recognition value changes by a predetermined percentage or more when the spherical aberrations are switched from one setting into another, then the disk type recognizing section 160 determines that the type of the optical disk currently loaded agrees with that of the optical system now used.

The output of the photodetector 136 is also supplied to a signal reading section (not shown), where the signal is processed by the high-pass filter, equalizer (EQ), digitizer, and ECC/demodulator, thereby reproducing the RF signal. The RF signal reflects a local variation in the reflectance of the information storage layer of the optical disk 102 and is used to read the address information and user data.

Hereinafter, the procedure of disk type recognition processing will be described with reference to FIG. 15, as well as FIG. 13.

First, in Step S1, various settings are done to get ready to process a BD. Specifically, in accordance with the instruction given by the CPU 146, the BD optical system is selected. More particularly, drive current is supplied to a violet semiconductor laser for BDs, included in the light source 122, thereby radiating a light beam with a wavelength of about 405 nm and a power of 0.25 W and getting the light beam converged by the objective lens 130 with a numerical aperture of 0.85. The spherical aberration control section 142 shown in FIG. 13 controls the spherical aberration correcting section 128 so as not to produce any spherical aberration if the transmission stack thickness is 0.1 mm. In this preferred embodiment, the corrective collimator lens in the spherical aberration correcting section 128 is displaced to a position associated with the transmission stack thickness of 0.1 mm.

Next, in Step S2, the objective lens 130 is retracted from the optical disk 102. Specifically, the focus control section 140 lowers the objective lens 130 in the optical reference axis direction, thereby moving the focal point of the light beam to a region that is sufficiently distant from the optical disk 102.

Then, in Step S3, the amplitude and degree of symmetry of the FE signal are detected with the objective lens 130 advanced toward the optical disk 102. In this processing step, the focus control section 140 moves the focal point of the light beam to a depth of 0.2 mm or more as measured from the disk surface. While the focal point of the light beam is moving, the amplitude detecting section 152 detects the maximum value and minimum value of the FE signal, thereby calculating the amplitude. In the meantime, the symmetry detecting section 154 evaluates the degree of symmetry based on the maximum and minimum values of the FE signal. The disk type recognition section 160 multiplies together the amplitude and the degree of symmetry of the FE signal and stores the product as disk type recognition value V1 in the next processing step S4.

Thereafter, in Step S5, the objective lens 130 is retracted away from the optical disk 102 as in Step S2. Then, in Step S6, the settings of the spherical aberration are changed. Specifically, the spherical aberration control section 142 controls the spherical aberration correcting section 128 so as to produce no spherical aberration if the transmission stack thickness is 0.12 mm. In this preferred embodiment, the corrective collimator lens in the spherical aberration correcting section 128 is displaced to a position associated with the transmission stack thickness of 0.12 mm.

Next, in Step S7, the amplitude and degree of symmetry of the FE signal are detected with the objective lens 130 moved toward the optical disk 102 as in Step S3 and the disk type recognition section 160 calculates the disk type recognition value. In the next processing step S8, the disk type recognition section 160 stores that value as disk type recognition value V2. Then, in Step S9, the objective lens 130 is retracted away from the optical disk 102 again.

Thereafter, in Step S10, the disk type recognition is carried out finally. More specifically, the disk type recognition section 160 divides the difference between disk type recognition values V1 and V2 by disk type recognition value V1 and determines whether or not the absolute value of the quotient is greater than a predetermined threshold value. If the answer is YES, the disk type recognition section 160 recognizes the given optical disk 102 as a BD. Otherwise (i.e., if the absolute value is equal to or smaller than the threshold value), then the disk type recognition section 160 recognizes the given optical disk 102 as a non-BD.

In this manner, the optical disk drive of this preferred embodiment can determine properly whether or not the optical disk loaded is compatible with the optical system being used by changing the settings of the spherical aberration correcting section 128. According to this preferred embodiment, there is no need to detect both the disk surface and the information storage layer accurately and the rate of variation in signal level is just detected between multiple spherical aberration states. Consequently, the problem as pointed out for the prior art never happens according to the present invention.

In the preferred embodiment described above, the product of the amplitude and the degree of symmetry of the FE signal is defined as the disk type recognition value. Alternatively, the disk type recognition value may be defined by either the amplitude or the degree of symmetry of the FE signal. Nevertheless, if the magnitude of correction on spherical aberration changes with the transmission stack thickness of the optical disk loaded, not so much the degree of symmetry of the FE signal as the amplitude thereof responds more sensitively. That is why the disk type recognition is preferably carried out by either the amplitude of the FE signal only, or its amplitude and the degree of symmetry in combination, rather than only by the degree of symmetry thereof.

Optionally, to reduce the influence of variation in reflectance between optical disks, the disk type recognition may also be carried out using a normalized FE signal, which may be obtained by dividing the amplitude of the FE signal by the all-sum (AS) signal. Alternatively, the normalized FE signal may also be obtained by dividing the amplitude of the FE signal by the sum signal (FS) of the differential inputs of the FE signal.

In the preferred embodiment described above, the influence of the light reflected from the surface of the optical disk on the FE signal is not taken into consideration. Actually, however, the light beam is also reflected from the surface of the optical disk albeit only partially. Thus, an S-curve representing that type of reflected light sometimes appears on the FE signal.

FIGS. 16A and 16B are drawings corresponding to FIGS. 7A and 7B, respectively. However, unlike the example shown in FIGS. 7A and 7B, small S-curves are also detected from the surface of the optical disk in the example shown in FIGS. 16A and 16B.

The following Table 1 summarizes the amplitudes and degrees of symmetry of S-curves, which were detected from the surface of a BD and from the information storage layer (BD layer) thereof, in a situation where the aberration correction conditions were set so as to minimize the spherical aberration at transmission stack thicknesses of 100 μm and 75 μm.

TABLE 1

| | Aberration correction condition | | | |
| --- | --- | --- | --- | --- |
| | transmission stack thickness of 100 μm | | transmission stack thickness of 75 μm | |
| Focus position | On surface | On storage layer | On surface | On storage layer |
| Amplitude of S-curve | small | large | small | Small |
| Degree of symmetry of S-curve | Low | High | Low | Low |

As can be seen, if the amplitude of at least one S-curve decreases when the aberration correction condition that minimizes the spherical aberration at a transmission stack thickness of 100 μm is changed into the aberration correction condition that minimizes the spherical aberration at a transmission stack thickness of 75 μm, then the given optical disk may be recognized as a BD including an information storage layer at a level corresponding to the transmission stack thickness of 100 μm. Thus, according to this preferred embodiment, even if an S-curve representing the light reflected from the surface of an optical disk is observed, it can be determined easily and highly accurately whether the optical disk currently loaded in the optical disk drive is a BD or not.

FIGS. 16C and 16D show FE signals detected from a DVD when the spherical aberration was minimized at transmission stack thicknesses of 100 μm and 75 μm, respectively. In this example, the focal length of the light beam to read BDs was so short that the focal point of the light beam for BDs could not reach the information storage layer of the DVD (i.e., the DVD layer). That is why the S-curves appearing on the FE signals just represented the light that was reflected from the surface of the DVD.

As can be seen, although S-curves appeared on the FE signals due to the surface reflection of the DVD, the waveforms of the S-curves hardly changed even if the aberration correction conditions were changed. This is because the spherical aberration was not minimized on the surface of the DVD. That is why if no variations are sensed in the amplitudes of any S-curve(s) observed on the FE signals even when the aberration correction conditions are changed, the given optical disk may be recognized as a non-BD.

In the example shown in FIG. 7C, even though the BD optical system is used, the focus position of the light beam reaches the DVD's information storage layer. However, to carry out the disk type recognition of the present invention, the focus position of the light beam does not have to reach the DVD's information storage layer as shown in FIGS. 16C and 16D. This is because unless the focus position of the light beam reaches the DVD's information storage layer, the S-curves representing the surface reflection of the optical disk hardly change even when the spherical aberration correction conditions are changed. As a result, the optical disk may be recognized as a non-BD.

If the optical disk currently loaded is recognized as a non-BD, then it is necessary to determine whether the optical disk is a DVD or a CD, which will be described in detail later.

Embodiment 2

In the preferred embodiment described above, only one value is selected as the transmission stack thickness of BDs. However, the transmission stack thicknesses of BDs may fall within the range of 0.095 mm to 0.105 mm according to Basic Format Specification. That is why BDs actually on the market have thicknesses within the range of 0.095 mm to 0.105 mm. From this standpoint, if the transmission stack thickness of a BD that has been loaded into the optical disk drive were actually slightly different from 0.1 mm (e.g., 0.105 mm), then the difference between the disk type recognition values V1 and V2 calculated by the optical disk drive of the first preferred embodiment described above would be too small to recognize the type of the given disk accurately.

To overcome such a problem, according to this preferred embodiment, the magnitudes of correction on spherical aberration are changed within the standard range of permissible transmission stack thicknesses of BDs and the disk type recognition values are figured out at the respective magnitudes of correction on spherical aberration, thereby adopting the greatest disk type recognition value as disk type recognition value V1. This is because the disk type recognition value maximizes when the transmission stack thickness of a BD loaded into the optical disk drive is closest to the transmission stack thickness corresponding to the selected magnitude of correction on spherical aberration.

Hereinafter, the procedure of disk type recognition processing according to this preferred embodiment will be described in detail with reference to FIG. 17.

In this preferred embodiment, the magnitudes of correction on spherical aberration are changed in three stages so as to produce no spherical aberration at the transmission stack thicknesses of 0.095 mm, 0.1 mm, and 0.105 mm that are close to the actual transmission stack thickness of a BD. These transmission stack thicknesses are selected from the range of permissible transmission stack thicknesses of BDs. And at the three different stages of spherical aberration correction conditions, the amplitudes and the degrees of symmetry of the FE signal are measured. More specifically, in Step S21, the spherical aberration correction is set for a BD with a transmission stack thickness of 0.095 mm (do settings for BD (A)). In such a state, the objective lens 130 shown in FIG. 13 is moved significantly back and forth in the optical reference axis direction, thereby detecting the S-curve of the FE signal such as that shown in FIG. 9. And based on the amplitude and degree of symmetry of this FE signal, disk type recognition value V1A is calculated and stored in a memory in Step S22.

Next, in Step S23, the spherical aberration correcting section 128 shown in FIG. 13 is controlled to change its settings (i.e., the positions of the corrective collimator lens). In this manner, the spherical aberration correction setting is changed into setting for a BD with a transmission stack thickness of 0.1 mm (do settings for BD (B)). In such a state, the objective lens 130 is moved significantly back and forth in the optical reference axis direction, thereby detecting the amplitude and degree of symmetry of the FE signal. Then, in Step S24, disk type recognition value V1B is calculated and stored in the memory.

In the same way, in Step S25, the spherical aberration correcting section 128 is controlled to further change its settings (i.e., the positions of the corrective collimator lens). In this manner, the spherical aberration correction setting is changed into setting for a BD with a transmission stack thickness of 0.105 mm (do settings for BD (C)). In such a state, the objective lens 130 is moved significantly back and forth in the optical reference axis direction, thereby detecting the amplitude and degree of symmetry of the FE signal. Then, in Step S26, disk type recognition value V1C is calculated and stored in the memory.

Supposing the optical disk actually loaded is a BD with a transmission stack thickness of 0.105 mm, disk type recognition value V1C, which has been calculated with the spherical aberration corrected for a BD with the transmission stack thickness of 0.105 mm, has the greatest value among the three disk type recognition values V1A, V1B and V1C. Thus, in Step S27, the greatest one of the three disk type recognition values V1A, V1B and V1C is adopted as disk type recognition value V1 and stored in the memory.

Next, in Step S28, the magnitudes of correction on spherical aberration are changed so as to produce no spherical aberration at a transmission stack thickness of 0.12 mm (which is outside of the range of permissible transmission stack thicknesses of BDs) and the amplitude and degree of symmetry of the FE signal are detected. In this manner, disk type recognition value V2 is calculated and stored in the memory in Step S29.

In a non-BD optical disk (a DVD, for example), if the conditions are set so as to minimize the spherical aberration at a transmission stack thickness of 0.095 mm to 0.12 mm, the amplitude and degree of symmetry of the resultant FE signal hardly change. In a BD, on the other hand, if the actual transmission stack thickness of the BD is 0.105 mm, for example, the amplitude and degree of symmetry of the FE signal will change significantly depending on whether the transmission stack thickness that minimizes the spherical aberration is 0.1 mm or 0.105 mm.

In this preferred embodiment, the disk type recognition is carried out in Step S30 based on disk type recognition value V1 (which is the greatest one of the three disk type recognition values that have been calculated first) and disk type recognition value V2. Consequently, even if the actual thicknesses of optical disks are slightly variable, the type of each and every given optical disk can be recognized correctly.

It should be noted that the spherical aberration is variable not only with the transmission stack thickness of the optical disk but also with the optical properties of the optical system and the temperature of the environment. That is why the setting of the spherical aberration correcting section should not be constant to minimize the spherical aberration. In other words, the magnitude of correction to actually minimize the spherical aberration (e.g., the position of the corrective collimator lens 8 shown in FIG. 14) sometimes cannot be fixed at a single value in advance. In that case, the levels of the FE signal are preferably actually measured with the magnitudes of correction on spherical aberration changed and a magnitude of correction that minimizes the spherical aberration is preferably adopted.

Embodiment 3

In the preferred embodiments described above, the disk type recognition is carried out using only the BD optical system. However, the present invention is in no way limited to those specific preferred embodiments. For example, if the spherical aberration correcting section can correct the aberration using a DVD optical system in a multi-drive that can deal with every type of optical disks including BDs, DVDs and BDs, then the given optical disk may be recognized as a DVD or a CD using the DVD optical system. For instance, when the optical pickup 30 shown in FIG. 14 is used, the spherical aberration can also be corrected for light beams to read DVDs and CDs. In that case, first, it is determined, by using the BD optical system, whether the given optical disk is a BD or not. If the given optical disk has turned out to be a non-BD, then the disk type recognition of the present invention may be carried out using the DVD optical system to determine whether the optical disk is a DVD or not. Alternatively, after it is determined by using the DVD optical system whether the given optical disk is a DVD or not, it may be determined by using the BD optical system whether the disk is a BD or not. However, the numerical aperture (NA) of the objective lens included in the BD optical system is greater than that of an objective lens for any other type of optical disk. That is why when the BD optical system is used, the spherical aberration is easily produced and the disk type recognition of the present invention can be carried out with high sensitivity. For that reason, it is preferable to determine, by using the BD optical system first, whether the given optical disk is a BD or not.

Embodiment 4

If a CD has been loaded upside down into the optical disk drive by mistake, then the information storage layer of the CD will be located at a depth of 0.05 mm from the light incoming side of the optical disk (i.e., the label side of the CD in this case). This depth is close to that of the information storage layer of a BD. That is why the FE signal detected from the CD may have increased amplitude and increased degree of symmetry under the spherical aberration correction condition associated with the transmission stack thickness of BDs. As a result, the CD that has been loaded upside down may be taken for a BD that has been loaded properly.

To overcome such a problem, the disk type recognition processing may be carried out in the procedure shown in FIG. 18.

First, in Step S41, the spherical aberration correction condition is set so as to process a BD. Next, in Step S42, disk type recognition value V1 is calculated and stored in the memory. Then, in Step S43, the spherical aberration correction condition for BDs is changed into a different spherical aberration correction condition. And in Step S44, disk type recognition value V2 is calculated and stored in the memory. These processing steps are carried out just as already described for the first preferred embodiment.

Next, in Step S45, the absolute value of the difference between disk type recognition values V1 and V2 is divided by disk type recognition value V1 and the quotient is compared to a first threshold value (which will also be referred to herein as "threshold value TH1"). If the quotient is equal to or smaller than the first threshold value, the optical disk currently loaded is recognized as a non-BD.

Subsequently, in Step S46, the absolute value of the difference between disk type recognition values V1 and V2 is divided by disk type recognition value V1 and the quotient is compared to a second threshold value, which is greater than the first threshold value and will sometimes be referred to herein as "threshold value TH2". If the quotient is greater than the second threshold value, the given optical disk is recognized as a BD. However, if the quotient is equal to or smaller than the second threshold value, the optical disk currently loaded is regarded in Step S47 as either a BD or a CD that has been inserted upside down.

If the optical disk currently loaded is regarded as either a BD or a CD that has been inserted upside down, then the magnitude of correction on spherical aberration is set in the next processing step S48 so as to produce no spherical aberration at the transmission stack thickness of 0.05 mm (i.e., a magnitude of correction on spherical aberration is defined to cope with a CD loaded upside down) and the amplitude and degree of symmetry of the FE signal are detected. And the resultant disk type recognition value V3 is compared to disk type recognition value V1 in Step S50. If disk type recognition value V3 is less than disk type recognition value V1, then the optical disk loaded is recognized as a BD. Otherwise, the optical disk loaded is recognized as a CD that has been loaded upside down.

It should be noted that in determining whether the given optical disk is a single-layer BD with only one information storage layer or a CD that has been loaded upside down, the correction on spherical aberration does not have to be defined so as to minimize the spherical aberration at the transmission stack thickness of 0.05 mm but a value close to 0.05 mm may be adopted. For example, the amplitude of an FE signal generated under the settings that minimize the spherical aberration at a transmission stack thickness of 0.075 mm may be compared to that of an FE signal generated under the settings that minimize the spherical aberration at a transmission stack thickness of 0.1 mm. As for a single-layer BD, when the transmission stack thickness is decreased from 0.1 mm to 0.075 mm, the amplitude of the FE signal decreases sufficiently. However, in a CD that has been loaded upside down, the label side thereof has a thickness of 0.050 mm or less. That is why when the transmission stack thickness is decreased from 0.1 mm to 0.075 mm, the amplitude of the FE signal increases significantly.

Embodiment 5

The disk type recognition of the present invention may be carried out only when the type of the given optical disk cannot be recognized by any known disk type recognition method.

According to the first preferred embodiment of the present invention described above, the processing step of calculating the disk type recognition value by moving the objective lens significantly in the optical reference axis direction needs to be carried out twice. Thus, it may take more time to get the disk type recognition done by the method of the present invention than by a known disk type recognition method. That is why if the sequence of known disk type recognition is normally carried out and if the disk type recognition of the present invention is performed only when the disk type cannot be recognized by the known method, the time it takes to get the disk type recognition done can be shortened as a whole.

Embodiment 6

Hereinafter, a typical timing to change the aberration correction conditions will be described with reference to FIGS. 19A and 19B, which show how the focus positions of the light beam move up and down with respect to the optical disk 200. In FIGS. 19A and 19B, the abscissa (and the arrows) indicates the passage of time during the disk type recognition processing.

In the example illustrated in FIG. 19A, after the S-curve is detected on the FE signal by moving the objective lens 250 upward under the first aberration correction condition (associated with the transmission stack thickness of 100 μm, for example), the objective lens 250 is once retracted to its initial position. Thereafter, by moving the objective lens 250 upward again under the second aberration correction condition (associated with the transmission stack thickness of 75 μm, for example), the S-curve is detected on the FE signal.

In detecting the S-curve on the FE signal to recognize the type of the given optical disk, the objective lens 250 needs to be moved upward while maintaining the same aberration correction condition. That is why as the objective lens 250 is moved upward, the position of the aberration corrective collimator lens also changes to keep the gap between these two lenses constant. However, the aberration correction conditions can be changed by varying the distance between the objective lens 250 and the aberration corrective collimator lens as shown in FIGS. 6A through 6C. In the example illustrated in FIG. 19A, while the objective lens 250 is being lowered after the S-curve has been detected under the first aberration correction condition, the distance between the objective lens 250 and the aberration corrective collimator lens is adjusted, thereby changing the aberration correction conditions (e.g., from the condition for a transmission stack thickness of 100 μm into the condition for a transmission stack thickness of 75 μm).

In the example illustrated in FIG. 19B, after the S-curve has been detected on the FE signal by moving the objective lens 250 upward under the first aberration correction condition (e.g., associated with a transmission stack thickness of 100 μm), the aberration correction condition is changed into a second aberration correction condition (e.g., associated with a transmission stack thickness of 75 μm). Thereafter, the S-curve is detected on the FE signal by lowering the objective lens 250 under the second aberration correction condition.

As described above, during the disk type recognition operation, the aberration correction conditions may be changed at an appropriate timing while the objective lens 250 is being moved either upward or downward.

Embodiment 7

In the examples that have just been described with reference to FIGS. 19A and 19B, the objective lens 250 is moved up and down with respect to the optical disk 200 in rest position. However, the disk type recognition operation of the present invention may also be carried out on a rotating optical disk, too. The surface of the optical disk does not always cross the axis of rotation at right angles but may sometimes be slightly tilted to the axis of rotation. Or the optical disk itself may be warped. That is why the portion of the optical disk that is located right over the objective lens 250 in rest position changes its height vertically (or moves up and down) as the optical disk spins. That is to say, the rotating optical disk has a disk flutter (i.e., causes out-of-plane vibrations, or axial runout). Consequently, while the optical disk is rotating, the distance between the optical disk 200 and the objective lens 250 changes periodically even if the objective lens 250 is fixed at the same position.

FIG. 20 schematically illustrates the levels of the BD layer of the optical disk 200 at a time t1 and at a time t2, respectively. In this example, the focus position of the light beam has not reached the BD layer yet at the time t1 but is located over the BD layer at the time t2. That is to say, the focus position of the light beam has passed the BD layer between the times t1 and t2.

According to this preferred embodiment, by taking advantage of such out-of-plane vibrations of the optical disk, the disk type recognition operation is carried out without changing the position of the objective lens 250 in the optical reference axis direction.

First, by spinning the optical disk under the first aberration correction condition (e.g., associated with a transmission stack thickness of 100 μm), the S-curve is detected on the FE signal by utilizing the disk flutter. In this case, at least one S-curve is detected during a predetermined period including a period from the time t3 through the time t4 as shown in FIG. 21A. Next, after the aberration correction condition has been changed into the second aberration correction condition (e.g., associated with a transmission stack thickness of 75 μm), at least one S-curve is detected during a predetermined period including a period from the time t5 through the time t6 as shown in FIG. 21B.

In this example, the objective lens 250 never moves up and down and the focus position of the light beam is fixed. However, due to the out-of-plane vibrations of the rotating optical disk, the relative position of the information storage layer of the optical disk to the focus position of the light beam changes, thus generating the S-curve on the FE signal. In the example illustrated in FIGS. 21A and 21B, if the aberration correction conditions are changed while the optical disk is rotating, the S-curves of the FE signal change its waveforms. That is why the given optical disk may be recognized as a BD.

As described above, if the disk type recognition is carried out with the optical disk rotated, there is no need to move the objective lens 250 up and down. Also, by turning the optical disk a number of times consecutively under the respective aberration correction conditions, a plurality of S-curves can be detected. And if the amplitudes and degrees of symmetry of the S-curves are detected a number of times and their averages are calculated, the disk type can be recognized even more accurately.

Embodiment 8

Hereinafter, it will be described how to distinguish a single-layer BD with only one information storage layer from a dual-layer BD with two information storage layers.

Suppose a dual-layer BD, including a layer L1 at a transmission stack thickness of 75 μm and a layer L0 at a transmission stack thickness of 100 μm, has been loaded into the optical disk drive of this preferred embodiment as shown in FIGS. 22A and 22B.

First, as shown in FIG. 22A, by moving the focus position of the light beam upward under the first aberration correction condition (e.g., associated with a transmission stack thickness of 75 μm), the S-curves of the FE signal are detected. In this case, three S-curves are detected due to the reflection from the surface of the optical disk, the layer L1 and the layer L0, respectively. Since the aberration correction condition is set so as to minimize the spherical aberration at the transmission stack thickness of 75 μm, the S-curve detected from the layer L1 has the maximum amplitude.

Next, after the focus position of the light beam has been returned to its initial position, the S-curves of the FE signal are detected again by moving the focus position of the light beam upward under the second aberration correction condition (e.g., associated with a transmission stack thickness of 100 μm) as shown in FIG. 22B. Since the aberration correction condition is set so as to minimize the spherical aberration at the transmission stack thickness of 100 μm in this case, the S-curve detected from the layer L0 has the maximum amplitude.

The following Table 2 summarizes the results of these disk type recognition operations:

TABLE 2

| | Aberration correction conditions | | | | | |
|---|---|---|---|---|---|---|
| | transmission stack thickness of 75 μm | | | transmission stack thickness of 100 μm | | |
| | Focus position | | | | | |
| | On surface | On L1 | On L0 | On surface | On L1 | On L0 |
| Amplitude of S-curve | small | Large | small | small | small | large |
| Degree of symmetry of S-curve | Low | High | Low | Low | Low | High |

Sometimes no S-curves may be detected from the surface of the optical disk for some reason. In that case, the results summarized in the following Table 3 are obtained:

TABLE 3

| | Aberration correction conditions | | | | | |
|---|---|---|---|---|---|---|
| | transmission stack thickness of 75 μm | | | transmission stack 1 thickness of 100 μm | | |
| | Focus position | | | | | |
| | On surface | On L1 | On L0 | On surface | On L1 | On L0 |
| Amplitude of S-curve | — | Large | small | — | small | large |
| Degree of symmetry of S-curve | — | High | Low | — | Low | High |

On the other hand, if the same operations as those described above are performed on a single-layer BD that has been loaded in the optical disk drive, then the results shown in the following Table 4 are obtained:

TABLE 4

| | Aberration correction conditions | | | | | |
|---|---|---|---|---|---|---|
| | transmission stack thickness of 75 μm | | | transmission stack thickness of 100 μm | | |
| | Focus position | | | | | |
| | On surface | On L1 | On L0 | On surface | On L1 | On L0 |
| Amplitude of S-curve | small | — | small | small | — | large |
| Degree of symmetry of S-curve | Low | — | Low | Low | — | High |

The single-layer BD has an information storage layer (i.e., the layer L0) only at the transmission stack thickness of 100 μm. That is why the amplitude of the S-curve increases only under the aberration correction condition that minimizes the spherical aberration on the layer L0 but decreases under the other aberration correction conditions.

Comparing the results shown in Table 3 and 4 with each other, it is clear that if the focus position of the light beam is moved upward under the same aberration correction condition, the FE signal may have the same number of S-curves, no matter whether the given optical disk is a dual-layer BD or a single-layer BD. For that reason, it is impossible to determine, just by counting the number of the S-curves, whether the given optical disk is a dual-layer BD or a single-layer BD. However, as can be seen from Table 3, both of the two S-curves detected from the dual-layer BD change their amplitudes when the aberration correction conditions are changed, but only one of the two S-curves detected from the single-layer BD changes its amplitude when the aberration correction conditions are changed.

As described above, if the amplitudes of the S-curves of the FE signals detected from the layers L1 and L0 change from small into large, or vice versa, under the aberration correction conditions that minimize the spherical aberration on the layers L0 and L1, then the given optical disk may be recognized as a dual-layer BD. On the other hand, if the waveforms of the S-curves change at only one transmission stack thickness when the aberration correction conditions are changed, then the given optical disk may be recognized as a single-layer BD.

Embodiment 9

Hereinafter, it will be described how to distinguish a dual-layer BD with two information storage layers from a quad-layer BD with four information storage layers.

The quad-layer BD may include layers L0, L1, L2 and L3 at transmission stack thicknesses of 100 μm, 75 μm, 60 μm, and 50 μm, respectively, as shown in FIG. 23.

If the optical disk currently loaded in the optical disk drive has turned out to be a BD by the disk type recognition processing described above, then it is determined, by performing the following operations, whether the BD is a dual-layer BD or a quad-layer BD.

First, by moving the focus position of the light beam upward under the aberration correction condition that minimizes the spherical aberration at a transmission stack thickness of 60 μm, the S-curves of the FE signal are detected. In this case, if the quad-layer BD has been loaded, then five S-curves will be detected due to the reflection from the surface of the optical disk and the layers L3, L2, L1 and L0, respectively. Since the aberration correction condition is set so as to minimize the spherical aberration at the transmission stack thickness of 60 μm, the S-curve detected from the layer L2 has the maximum amplitude.

Next, after the focus position of the light beam has been returned to its initial position, the S-curves of the FE signal are detected again by moving the focus position of the light beam upward under the aberration correction condition that minimizes the spherical aberration at the transmission stack thickness of 75 μm. Since the aberration correction condition is set so as to minimize the spherical aberration at the transmission stack thickness of 75 μm in this case, the S-curve detected from the layer L1 has the maximum amplitude. The following Table 5 summarizes the results of these disk type recognition operations:

TABLE 5

| | Aberration correction condition | | | | | | | | | |
|---|---|---|---|---|---|---|---|---|---|---|
| | transmission stack thickness of 60 μm | | | | | transmission stack thickness of 75 μm | | | | |
| | Focus position | | | | | | | | | |
| | surface | L3 | L2 | L1 | L0 | surface | L3 | L2 | L1 | L0 |
| Amplitude of S-curve | S | S | L | S | S | S | S | S | L | S | where S indicates that the amplitude is relatively small and L indicates that the amplitude is relatively large.

If the same operations as those described above are performed on a dual-layer BD that has been loaded in the optical disk drive, then the results shown in the following Table 6 are obtained:

TABLE 6

| | Aberration correction conditions | | | | | |
|---|---|---|---|---|---|---|
| | transmission stack thickness of 60 μm | | | transmission stack thickness of 75 μm | | |
| | Focus position | | | | | |
| | On surface | On L1 | On L0 | On surface | On L1 | On L0 |
| Amplitude of S-curve | small | small | small | Small | large | Large |
| Degree of symmetry of S-curve | Low | Low | Low | Low | High | Low |

Thus, in the quad-layer BD, the S-curve had large amplitude on the layer L2 when the spherical aberration correction condition was set so as to minimize the spherical aberration at the transmission stack thickness of 60 μm but had large amplitude on the layer L1 when the spherical aberration correction condition was set so as to minimize the spherical aberration at the transmission stack thickness of 75 μm.

On the other hand, in the dual-layer BD, since the spherical aberration was always significant on all of the surface, the layer L0 and the layer L1 when the spherical aberration correction condition was set so as to minimize the spherical aberration at the transmission stack thickness of 60 μm, all of the resultant S-curves had small amplitudes. However, when the spherical aberration correction condition was set so as to minimize the spherical aberration at the transmission stack thickness of 75 μm, the amplitudes of the S-curves increased on the layers L1 and L0. Consequently, in the quad-layer BD, even if the spherical aberrations were changed, the amplitudes of the S-curves did not change so much. But in the dual-layer BD, when the spherical aberrations were changed, the amplitudes of the S-curves increased as the transmission stack thicknesses minimizing the spherical aberration increased from 60 μm to 75 μm.

As is clear from these results, when the aberration correction conditions are changed, the amplitudes of the S-curves of the FE signals vary in mutually different patterns between the quad-layer BD and the dual-layer BD. That is why by detecting that difference, the given optical disk may be easily recognized as a quad-layer BD or a dual-layer BD.

As described above, according to this preferred embodiment, by repeatedly performing the operation of detecting the S-curve of the FE signal while selecting an information storage layer at an appropriate level (i.e., a transmission stack thickness) where the spherical aberration should be minimized, the type of the given multilayer BD (i.e., the number of the information storage layers that the disk has) can be recognized. The number of information storage layers of a recognizable multilayer BD does not have to be two or four but may also be any other number.

Embodiment 10

The eighth and ninth preferred embodiments of the present invention described above are methods of determining whether the optical disk currently loaded in the optical disk drive is a single-layer BD or a multilayer BD in a situation where the optical disk has been recognized as a BD. However, the optical disk currently loaded in the optical disk drive may naturally be a non-BD optical disk. Hereinafter, a series of disk type recognition operations to be performed after the optical disk drive has been loaded with an optical disk will be described with reference to FIGS. 24 through 26.

First, referring to FIG. 24, shown is the flow of the first half of the disk type recognition processing. First, in Step S60, a light beam to read BDs is radiated from a blue laser diode in the optical pickup. Next, in Step S61, an aberration correction condition is set so as to minimize the spherical aberration on the layer L0 (with a transmission stack thickness of 0.1 mm). Then, in Step S62, the amplitude FEV0 and the degree of symmetry FEB0 of the S-curve of the FE signal and an all sum signal AS0 are measured. After the aberration correction conditions have been changed so as to minimize the spherical aberration on the layer L1 (with a transmission stack thickness of 0.075 mm) in Step S63, the amplitude FEV1 and the degree of symmetry FEB1 of the S-curve of the FE signal and an all sum signal AS1 are measured in Step S64.

Thereafter, in Step S65, it is determined whether or not the amplitude FEV0 of the S-curve of the FE signal that was obtained in Step S62 is smaller than a predetermined value IGAI. If the answer is YES (i.e., if FEV0<IGAI), the given optical disk is recognized as a non-BD optical disk. Otherwise (i.e., if FEV0≧IGAI), the process advances to Step S66, in which the type of the given optical disk is recognized by the number of S-curves of the FE signal that was obtained in Step S62. Specifically, if the number of S-curves detected is zero, the light beam spot has passed no information storage layers of a BD (i.e., the light beam spot has not reached any information storage layer), and therefore, the given optical disk is recognized as a non-BD optical disk. On the other hand, if the number of S-curves detected is three, the light beam spot should have passed the surface and the two information storage layers L0 and L1. Thus, the given optical disk is recognized as a dual-layer BD. And if the number of S-curves detected is one or two, the process advances to Step S67, in which the A–B value defined by the following equation is calculated and compared to a predetermined value BDLVL:

$$A-B=FEV0\cdot(1-FEB0)/AS0-FEV1\cdot(1-FEB1)/AS1$$

the predetermined value BDLVL may fall within the range of 0.75 to 0.90, e.g., 0.85.

If the A–B value is large, then it means that the waveform of the S-curve has varied significantly due to the change of the spherical aberration correction conditions. That is to say, it means that the information storage layer L0 should be present at a position corresponding to the transmission stack thickness of 0.1 mm but the information storage layer L1 should not be present at a position corresponding to the transmission stack thickness of 0.075 mm. For that reason, if the given optical disk is a single-layer BD, the A–B value increases. But if the given optical disk is a dual-layer BD, then the A–B value decreases.

In this preferred embodiment, the processing step of changing the spherical aberration correction condition back into what minimizes the spherical aberration on the layer L0 with a transmission stack thickness of 0.1 mm is inserted between the processing steps S64 and S65.

If the given optical disk has been recognized as a non-BD optical disk in Steps S65 and S66, then the processing steps of the flowchart shown in FIG. 25 are carried out. More specifically, first, in Step S70, a light beam to read DVDs is radiated from a red laser diode in the optical pickup. Next, in Step S71, an aberration correction condition is set so as to minimize the spherical aberration on the DVD's layer L0 (with a transmission stack thickness of 0.6 mm). Then, in Step S72, the amplitude FEV06 and the degree of symmetry FEB06 of the S-curve of the FE signal and an all sum signal AS06 are measured. If three or more S-curves have been detected in Step S73, then the given optical disk is recognized as a dual-layer DVD because the surface and two information storage layers L0 and L1 should have been detected. On the other hand, if the number of S-curves detected is zero, then the light beam spot has passed no information storage layers of a DVD (i.e., has reached no information storage layer yet). And if one or two S-curves have been detected, then the A value defined by the following equation is compared to a first predetermined value in Step S74. And if the A value is greater than the first predetermined value, then the given optical disk is recognized as a single-layer DVD or a dual-layer DVD and the process advances to Step S75.

$$A=FEV06\cdot(1-FEB06)/AS06$$

On the other hand, if the A value is equal to or smaller than the first predetermined value, then the given optical disk is recognized as a non-BD optical disk because a CD or any other optical disk has been loaded and a S-curve representing its surface has been detected.

After the aberration correction conditions have been changed in Step S75 so as to minimize the spherical aberration at a position close to the CD's storage layer with a transmission stack thickness of 0.9 mm, the amplitude FEV09 and the degree of symmetry FEB09 of the S-curve of the FE signal and an all sum signal AS09 are measured in Step S76. Thereafter, in Step S77, the A−B value defined by the following equation is calculated and compared to a second predetermined value:

$$A-B=FEV06 \cdot (1-FEB06)/AS06 - FEV09 \cdot (1-FEB09)/AS09$$

By changing the spherical aberration correction conditions in this manner, it is possible to determine by the A−B value whether or not the waveforms of the S-curves have varied and recognize the given optical disk as a CD (or any other type of optical disk) or a single-layer DVD.

If the A−B value is equal to or smaller than the second predetermined value, then the given optical disk is recognized as a CD or any other type of optical disk.

On the other hand, if the A−B value is greater than the second predetermined value, then the process advances to Step S78, in which the type of the given optical disk is recognized again by the number of S-curves detected. If the number of S-curves detected is one, then the given optical disk can be recognized as a single-layer DVD. On the other hand, if the number of S-curves detected is two, then the given optical disk can be recognized as a dual-layer DVD. If the given optical disk has been recognized as a CD or any other type of optical disk, then the processing steps of the flowchart shown in FIG. 26 are carried out. More specifically, first, in Step S80, a light beam to read CDs is radiated from an infrared laser diode in the optical pickup.

A DUAL disk is an optical disk in which a DVD with a transmission stack thickness of 0.6 mm and a CD with a transmission stack thickness of 0.85 mm have been bonded together as side A (upper surface) and side B (back surface), respectively, as shown in FIGS. 27A and 27B. And data is supposed to be read from the CD and DVD portions by turning the DUAL disk over. The DUAL disk includes a CD layer with a transmission stack thickness t of as thin as 0.85 mm or more. That is why if such a DUAL disk has been loaded, the disk is easily taken for a DVD with a transmission stack thickness t of 0.6 mm or a CD with a transmission stack thickness t of ±1.2 mm by mistake. In view of this consideration, after the first spherical aberration correction condition is set so as to minimize the spherical aberration on a normal CD layer with a transmission stack thickness of 1.2 mm in Step S81, the amplitude FEV12 and degree of symmetry FEB12 of the S-curve of the FE signal and an all sum signal AS12 are measured in Step S82 according to this preferred embodiment. After that, the spherical aberration correction conditions are changed into the second spherical aberration correction condition that minimizes the spherical aberration on the CD layer (with a transmission stack thickness of 0.85 mm, for example) of the DUAL disk in Step S83. And then the amplitude FEV085 and degree of symmetry FEB085 of the S-curve of the FE signal and an all sum signal AS085 are measured in Step S84.

Thereafter, in Step S85, the A and B values defined by the following equations are calculated and compared to a predetermined value.

$$A=FEV12 \cdot (1-FEB12)/AS12$$

$$B=FEV085 \cdot (1-FEB085)/AS085$$

Based on the numerical values obtained by those measurements, if A−B>predetermined value is satisfied (if the answer is YES), then the given optical disk is recognized as a normal CD. If A−B>predetermined value is not satisfied (if the answer is NO), then the given optical disk is recognized as a DUAL disk.

In each of the preferred embodiments of the present invention described above, the optical disk drive can deal with not only BDs but also DVDs and CDs as well by itself. However, the present invention is in no way limited to such an optical disk drive but is applicable for use in any other type of optical disk drive. For example, even a BD-dedicated optical disk drive, which is not compatible with DVDs or BDs, may be loaded with a DVD or a CD by mistake. In that case, it should be sensed before a read/write operation that the optical disk loaded is not a BD. According to the present invention, even a DVD or a CD that has been loaded by mistake into an optical disk drive such as a BD-dedicated player can be recognized as a non-BD without fail.

Also, in the preferred embodiments described above, the type of the given optical disk is recognized by reference to the FE signal. Alternatively, an RF signal, a tracking error signal or any other suitable signal may also be used. In general, if the waveforms of a signal vary by changing the settings of spherical aberration correction and if the amplitude of a signal increases when the magnitude of correction on spherical aberration is associated with the transmission stack thickness of the optical disk loaded, then the disk type recognition may be carried out using such a signal.

The present invention is applicable for use in an optical disk drive that can deal with multiple types of optical disks and in various kinds of electronic devices including such an optical disk drive.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2005-282262 filed on Sep. 28, 2005 and No. 2006-255934 filed on Sep. 22, 2006, the entire contents of which are hereby incorporated by reference.

What is claimed is:

1. An optical disk drive having the ability to read data from a given optical disk that includes at least one information storage layer, the drive comprising:
   a motor for spinning the given optical disk;
   at least one optical system including at least one light source for radiating a light beam and a lens for converging the light beam onto the optical disk;
   a spherical aberration correcting section that is able to change the spherical aberration states of the light beam; and
   a control section for controlling the operations of the motor, the optical system and the spherical aberration correcting section, wherein the control section includes disk type recognizing means that makes the optical system irradiate the optical disk with the light beam, thereby determining whether or not the given optical disk is compatible with the optical system, and wherein the disk type recognizing means recognizes the type of the given optical disk by reference to first and second signal waveforms that have been generated based on the light beams reflected from the optical disk when the spherical aberration correcting section sets the spherical aberration states of the light beams to a first state and a second state, respectively, the second state being different from the first state.

2. The optical disk drive of claim 1, wherein when a parameter proportional to a difference between the first and second signal waveforms exceeds a reference value, the disk type recognizing means finds the given optical disk compatible with the light source and the lens that are used to radiate the light beam.

3. The optical disk drive of claim 1, wherein in controlling the spherical aberration correcting section so as to minimize the spherical aberration with respect to the optical disk compatible with the light source and the lens that are used to radiate the light beam, the control section changes the magnitudes of correction made by the spherical aberration correcting section into multiple different values and selects a signal waveform with the greatest amplitude as the first signal waveform from multiple signal waveforms that have been generated based on the light beams reflected from the optical disk at the multiple different magnitudes of correction.

4. The optical disk drive of claim 3, wherein the multiple different magnitudes of correction made by the spherical aberration correcting section are selected from a correction value range corresponding to a standard range of permissible transmission stack thicknesses of the optical disk that is compatible with the light source and the lens used to radiate the light beam.

5. The optical disk drive of claim 1, wherein the first and second signal waveforms are gotten by measuring a focus error signal that has been generated based on the light beam reflected from the optical disk.

6. The optical disk drive of claim 5, wherein the first and second signal waveforms have magnitudes that change with the amplitude of the focus error signal.

7. The optical disk drive of claim 1, wherein in performing the disk type recognition operation, the control section makes the light source irradiate the optical disk with a light beam having a wavelength of 400 nm to 410 nm using an objective lens having a numerical aperture of 0.84 to 0.86 as the lens initially.

8. The optical disk drive of claim 7, wherein if the parameter that is proportional to the difference between the first and second signal waveforms is equal to or smaller than a first reference value, the disk type recognizing means recognizes the given optical disk as a non-BD, and wherein if the parameter is greater than a second reference value that is greater than the first reference value, the disk type recognizing means recognizes the given optical disk as a BD, and wherein if the parameter is greater than the first reference value but equal to or smaller than the second reference value, the control section obtains the spherical aberration states of the light beam changed by the spherical aberration correcting section into a third state, which is different from the first and second states and in which the spherical aberration is minimized if a CD is loaded upside down, measures a third signal waveform that has been generated based on the light beam reflected from the optical disk, and determines that a CD has been loaded upside down if the amplitude of the third signal waveform has increased from that of the second signal waveform.

9. An optical disk drive having the ability to read data from multiple types of optical disks, each including at least one information storage layer, the drive comprising:

a motor for spinning a given one of the optical disks;

at least one light source for radiating light beams with multiple different wavelengths;

at least one lens for converging each said light beam onto the optical disk;

a spherical aberration correcting section that is able to change the spherical aberration states of the light beam; and a control section for controlling the operations of the motor, the light source, the lens and the spherical aberration correcting section, wherein the control section includes disk type recognizing means that irradiates the given optical disk with a light beam using the light source and the lens, thereby recognizing the type of the given optical disk, and wherein the disk type recognizing means recognizes the type of the given optical disk by reference to first and second signal waveforms that have been generated based on the light beams reflected from the optical disk when the spherical aberration correcting section sets the spherical aberration states of the light beam to a first state and a second state, respectively, the second state being different from the first state.

10. The optical disk drive of claim 9, wherein the control section obtains the first and second signal waveforms while controlling the spherical aberration correcting section so as to minimize the spherical aberration, and to produce a spherical aberration, respectively, with respect to an optical disk compatible with the light source and the lens that are used to radiate the light beam.

11. A method for driving an optical disk drive having the ability to read data from an optical disk including at least one information storage layer, the method comprising the steps of:

obtaining a first signal waveform by irradiating the optical disk with a light beam, of which the spherical aberration has been set to a first state, and by detecting the light beam that has been reflected from the optical disk;

obtaining a second signal waveform by irradiating the optical disk with a light beam, of which the spherical aberration has been set to a second state that is different from the first state, and by detecting the light beam that has been reflected from the optical disk; and recognizing the type of the given optical disk by the first and second signal waveforms.

12. The method of claim 11, wherein in the second state, spherical aberration is produced with respect to an optical disk compatible with the light source and the lens that are used to radiate the light beam, and wherein the spherical aberration in the first state is set to be smaller than that in the second state.

13. The method of claim 11, wherein when a parameter proportional to a difference between the first and second signal waveforms exceeds a reference value, the given optical disk is found to be compatible with the light source and the lens that are used to radiate the light beam.

14. The method of claim 11, wherein the spherical aberration is changed into multiple different states and a signal waveform with the greatest amplitude is selected as the first signal waveform from multiple signal waveforms that have been generated based on the light beams reflected from the optical disk in the multiple different spherical aberration states.

15. A controller for use in an optical disk drive including a spherical aberration correcting section, wherein the controller comprises disk type recognizing means for recognizing the type of an optical disk that has been loaded into the optical disk drive by irradiating the optical disk with a light beam, and wherein the disk type recognizing means recognizes the type of the given optical disk by reference to first and second signal waveforms that have been generated based on the light beams reflected from the optical disk when the spherical aberration correcting section sets the spherical aberration states of the light beams to a first state and a second state, respectively, the second state being different from the first state.

* * * * *